(12) United States Patent
Vartti et al.

(10) Patent No.: US 6,816,952 B1
(45) Date of Patent: Nov. 9, 2004

(54) LOCK MANAGEMENT SYSTEM AND METHOD FOR USE IN A DATA PROCESSING SYSTEM

(75) Inventors: Kelvin S. Vartti, Hugo, MN (US); Wayne D. Ward, New Brighton, MN (US); Hans C. Mikkelsen, Afton, MN (US)

(73) Assignee: Unisys Corporation, Blue Bell, PA (US)

( * ) Notice: Subject to any disclaimer, the term of this patent is extended or adjusted under 35 U.S.C. 154(b) by 204 days.

(21) Appl. No.: 10/160,947

(22) Filed: May 31, 2002

(51) Int. Cl.[7] .............................................. G06F 12/14
(52) U.S. Cl. .................................................... 711/163
(58) Field of Search ................................ 711/118, 145, 711/163

(56) References Cited

U.S. PATENT DOCUMENTS 6,047,358 A   4/2000  Jacobs ........................ 711/133
6,651,088 B1 * 11/2003  Zhang et al. ................ 709/213
6,671,779 B2 * 12/2003  Devereux .................... 711/128

* cited by examiner

Primary Examiner—Kevin L. Ellis
(74) Attorney, Agent, or Firm—Beth L. McMahon; Charles A. Johnson; Mark T. Starr

(57) ABSTRACT

The current invention provides an improved system and method for locking shared resources. The invention may operate in a data processing environment including a main memory system coupled to multiple instruction processors (IPs). Lock-type instructions are included within the hardware instruction set of ones of the IPs. These lock-type instructions are executed to gain access to a software-lock stored at a predetermined location within the main memory. After activating the software-lock, further, indivisible execution of the lock-type instruction causes one or more addresses associated with the software-lock to be retrieved. These addresses are used as pointers to, in turn, retrieve the data signals protected by the software-lock. Requests for the protected data signals are issued automatically by the hardware on behalf of the requesting IP, and the IP is allowed to continue instruction execution.

53 Claims, 9 Drawing Sheets

PROCESSING MODULE (POD)

UNLOCK-AND-FLUSH INSTRUCTION

100
LOCK MANAGEMENT SYSTEM AND METHOD FOR USE IN A DATA PROCESSING SYSTEM

CROSS-REFERENCE TO OTHER APPLICATIONS

The following co-pending applications of common assignee contain some common disclosure:

"Directory-Based Cache Coherency System Supporting Multiple Instruction Processor and Input/Output Caches", filed Dec. 31, 1997, Ser. No. 09/001,598, and incorporated herein by reference in its entirety.

BACKGROUND OF THE INVENTION

1. Field of the Invention

This invention relates generally to an improved memory management system and method for use in a data processing system; and, more particularly, relates to an improved lock management system and method.

2. Description of the Prior Art

Data processing systems are becoming increasing complex. Some systems, such as Symmetric Multi-Processor computer systems, couple two or more Instruction Processors (IPs) and multiple Input/Output (I/O) Modules to shared memory. This allows the multiple IPs to operate simultaneously on the same task, and also allows multiple tasks to be performed at the same time to increase system throughput.

As the number of units coupled to a shared memory increases, more demands are placed on the memory and memory latency increases. To address this problem, high-speed cache memory systems are often coupled to one or more of the IPs for storing data signals that are copied from main memory or from other cache memories. These cache memories are generally capable of processing requests faster than the main memory while also serving to reduce the number of requests that the main memory must handle. This increases system throughput.

While the use of cache memories increases system throughput, it causes other design challenges. When multiple cache memories are coupled to a single main memory for the purpose of temporarily storing data signals, some system must be utilized to ensure that all IPs are working from the same (most recent) copy of the data. For example, if a data item is copied, and subsequently modified, within a cache memory, another IP requesting access to the same data item must be prevented from using the older copy of the data item stored either in main memory or the requesting IP's cache. This is referred to as maintaining cache coherency. Maintaining cache coherency becomes more difficult as more cache memories are added to the system since more copies of a single data item may have to be tracked.

Another problem related to that described above involves providing a way to ensure continued access to shared data resources. In a shared memory system, various IPs may require access to common data stored in memory. A first IP that has copied such data within its cache memory may be forced to relinquish control over that data because another IP has requested that same information. If the first IP has not completed processing activities related to that data, the IP is required to re-gain access to it at a later time. In some instances, this is an acceptable way of performing processing activities. In other situations, losing control over a data item in the middle of program execution may result in errors.

The type of errors that are alluded to in the foregoing paragraph can best be understood by example. Consider a transaction processing system that is transferring funds from one bank account to another. The transaction is not considered complete until both bank account balances have been updated. If the instantiation of the software program, or "thread", which is processing this transaction loses access to the data associated with the account balances at a time when only half of the updates have been completed, the accounts may be in either an under- or over-funded state. To prevent this situation, some mechanism must be used to "lock", or activate, access rights to the data until the thread has completed all necessary processing activities. The thread then "unlocks", or deactivates, sole access rights to the data.

Various types of locking mechanisms have been introduced in the prior art. Many of these locking mechanisms use a lock cell or semaphore. A lock cell is a variable that is used to control a software-lock to an associated shared resource such as shared memory data. The state of the lock cell indicates whether the software-lock and the associated, protected shared resource is currently activated by another thread. Generally, a thread activates the software-lock using a lock-type instruction. As is known in the art, this type of instruction first tests the state of the lock cell. If the state of the lock cell indicates the shared resource is available, the instruction then sets the lock cell to activate the software-lock to the executing thread. These testing and setting operations are performed in an atomic operation by a single instruction to prevent multiple processors from inadvertently gaining simultaneous access to the same lock cell.

The lock cell is generally stored within main memory. As noted above, this lock cell may be a software-lock associated with, and protecting, shared data. By software convention, the shared data must not be accessed without first gaining authorization through the software-lock. Many prior art systems store the lock cell and associated data in a same cacheable entity of memory, or "cache line". As a result, when an IP attempts a lock-type operation on a lock cell, both the lock cell and at least some of the protected data are transferred to the IP's cache. However, if this attempt is made when the software-lock had already been activated by another thread, the transfer of the lock cell and protected data to the new requester's cache temporarily disrupts the processing activity of the IP executing the thread that had activated the software-lock. This reduces execution throughput.

A prior art solution for preventing the foregoing problem was to separate the lock cell into one cache line and the protected data into another cache line. While this solution prevents the thrashing of protected data when another thread attempts the software-lock, the solution causes the IP to acquire two cache lines. First, the IP copies the cache line that contains the lock cell in an exclusive state to attempt the software-lock. If the software-lock is successfully activated, the IP copies the cache line for the protected data upon the first reference to the data. The IP must temporarily suspend processing activities, or "stall", during the time the protected data is copied from memory. Therefore, while this scheme may prevent the thrashing of data during attempted lock activation, it results in cache line access stalls after the software-lock is successfully activated.

A related problem to the foregoing involves acquiring cache lines using specific cache line states. Some processing systems such as the ES7000™ platform commercially-available from the Unisys Corporation copy data to cache in a variety of states according to the first type of reference to the data or according to how the data was last used. For example, the data may be cached in a "shared" state such that the associated processor can read, but not update, this data. When the IP copies data to the cache in a shared state, a subsequent write operation causes the IP cache to acquire an "exclusive" state for the cache line so that the write can be completed. Acquiring the exclusive state after already having the shared state takes nearly as long as initially copying the data. Other data may be initially cached with exclusive state. Prior art locking mechanisms do not take into consideration how the data will be used when acquiring protected data from main memory, resulting in unnecessary disruption of processing activities.

Yet another drawback associated within prior art software-lock mechanisms involves the time associated with retrieving software-lock-protected data from main memory once a lock has been activated. The software-lock may be associated with one or more cache lines of data that must be copied from memory during subsequent transfer operations. These operations may each be relatively time consuming, especially if a multi-level caching hierarchy is involved. Some prior art systems force the requesting processor to wait in a stalled state as one or more cache lines of data associated with the software-lock are copied into its cache memory upon first reference to the data. Other prior art systems require that separate instructions be executed to pre-fetch the protected data cache lines once the software-lock has been activated. Since each transfer of this nature may require many instruction cycles to complete, throughput is dramatically impacted.

In view of the foregoing deficiencies in prior art locking systems, an improved locking mechanism is needed.

SUMMARY OF THE INVENTION

The current invention provides an improved system and method for locking shared resources. The invention may operate in a data processing environment including a main memory system coupled to multiple instruction processors (IPs). A novel lock-type instruction is included within the hardware instruction set of ones of the IPs. This lock-type instruction is executed to activate an addressed one of various lock cells stored at predetermined locations within the main memory.

After a software-lock has been activated by an executing thread, one or more addresses in the lock cell cache line are used as pointers to retrieve cache lines protected by the software-lock. In one embodiment, three cache lines are retrieved, although fewer or more such cache lines may be protected and automatically retrieved by activating the software-lock. Requests for the protected cache lines are issued automatically by the hardware on behalf of the executing thread. The IP continues instruction execution of the locking thread without stalling for the protected data cache lines. In this way, cache lines associated with the software-lock are automatically pre-fetched from main memory so that they will be available when a subsequent access is made by the thread. These pre-fetched data signals are copied to a cache memory associated with the requesting IP.

According to one aspect of the invention, each of the addresses contained in the lock data packet points to a different cache line of data. The cache lines of the protected data are different from the cache line of the lock cell. This allows an IP to cache the lock cell separately from the protected data so that an activation attempt may be made without disrupting the execution of another IP that has already activated the lock.

According to another aspect of the current invention, each of the pointer addresses is associated with an indicator for the type of access that is to be used when retrieving the protected data that is pointed to by that address. In one embodiment, either shared or exclusive access may be acquired.

In one embodiment of the invention, the lock-type instruction may be either a Lock-and-Pre-Fetch-and-Skip instruction or a Lock-and-Pre-Fetch instruction. The Lock-and-Pre-Fetch-and-Skip instruction allows the executing program to determine if the software-lock was successfully activated, or whether the software-lock was already activated by another thread. If an unsuccessful lock attempt occurs, the executing program determines if, and how, multiple attempts to activate the software-lock will be performed. In contrast, the Lock-and-Pre-Fetch instruction may involve only a single activation attempt that generates an interruption to an operating system in the event the attempt fails. When processing the interruption, the operating system may suspend the thread.

The invention may further include a novel Unlock-and-Flush instruction that unlocks, or deactivates, the software-lock after a thread has completed the processing associated with the protected data. This instruction, which may be included as part of the hardware instruction set of ones of the IPs, may flush the predetermined cache lines of the pre-fetched data to main memory. The instruction also unlocks the software-lock and flushes the lock-cell cache line to main memory. In one embodiment, all cache lines of protected data are flushed back to the main memory. In another embodiment, cache lines may be flushed on an individual basis. For example, all cache lines of pre-fetched protected data that are associated with exclusive access may be flushed to main memory, whereas all other pre-fetched cache lines obtained with shared access may be retained in cache memory.

According to yet another aspect of the invention, a method for performing locks within a data processing system is disclosed, wherein the data processing system includes a memory system coupled to multiple IPs. The method includes the steps of activating, on behalf of a requesting thread, a software-lock stored within the memory system. The method further includes issuing a request to retrieve cache lines that are pointed to by at least one address associated with the software-lock, and allowing the IP to continue execution without waiting for the requested data to be returned by the memory system.

According to yet another aspect of the invention, a method is provided for performing locks within a data processing system having a memory system and at least two IPs coupled to the memory system. The method includes executing a lock-type instruction that is part of the hardware instruction set of at least one of the IPs. If successful in activating the software-lock, the lock-type instruction uses at least one address associated with the software-lock to issue a request to pre-fetch data from main memory. In one embodiment, this data is stored within one or more cache lines. The IP is allowed to continue execution without waiting for the requested data to be returned from the main memory.

In yet a further embodiment of the invention, a system is provided for managing protected data within a data processor, wherein the data processor includes a memory coupled to multiple IPs. The system includes storage locations within the memory to store a software-lock. An inventive lock circuit is included within at least one of the IPs to execute a hardware lock instruction to activate the software-lock. The circuit further initiates a pre-fetch of associated, protected data from the memory while the IP continues instruction execution. The storage locations of the lock cell and the address of associated protected data may further contain indicators for a type of access rights to be associated with the pre-fetched protected data.

According to another embodiment of the invention, a system for managing protected data is provided. The system includes storage locations within a main memory that store a software-lock, and additional storage locations that store addresses of protected data. A cache memory coupled to the main memory is provided to temporarily cache the protected data after the software-lock has been activated. An inventive unlock circuit included within at least one of the IPs is provided to execute a hardware unlock instruction to deactivate the software-lock and to flush both the pre-fetched protected data and the lock cell from the cache memory back to the main memory.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

DETAILED DESCRIPTION OF THE PREFERRED EMBODIMENTS

The current invention provides an improved system and method for activating and deactivating software-locks within a data processing system.

I. Defined Terms

Cache line—A cache line is the smallest, individually cacheable unit of storage within the main memory and various caches.

Instruction Processor—An instruction processor (IP) is an implementation of a processing element of a processor system.

Lock cell—An operand of an atomic Read-with-lock-Test-optionally-Modify-Release-lock operation.

Protected Data—Data signals associated with a software-lock. By software convention, sole access to the protected data signals is provided to the thread that has activated the software-lock.

Read-with-lock-Test-optionally-Modify-Release-lock Operation—An atomic operation performed by an instruction processor on a lock cell. If the operation is successful, a software-lock is activated for the executing thread. If the operation is unsuccessful because the software-lock has already been activated by a different thread, the atomic operation does not modify the lock cell.

Software-lock—A software-defined variable that, when activated to a thread, gives the thread sole access to protected data and/or programs.

Software-lock Activation—The IP executes an atomic Read-with-lock-Test-optionally-Modify-Release-lock instruction successfully on a lock cell that was not active to designate the software-lock as being in an active state.

Software-lock Deactivation—The IP executes a hardware instruction on a lock cell to designate the software-lock as being in an inactive state.

Thread—A thread, also commonly referred to as a "program thread" or a "process thread", is an instance of a program executing on an IP.

II. System Description

Before continuing with a detailed description of the invention, a description of an exemplary data processing system as may employ the current invention is provided for discussion purposes.

Figure 1:
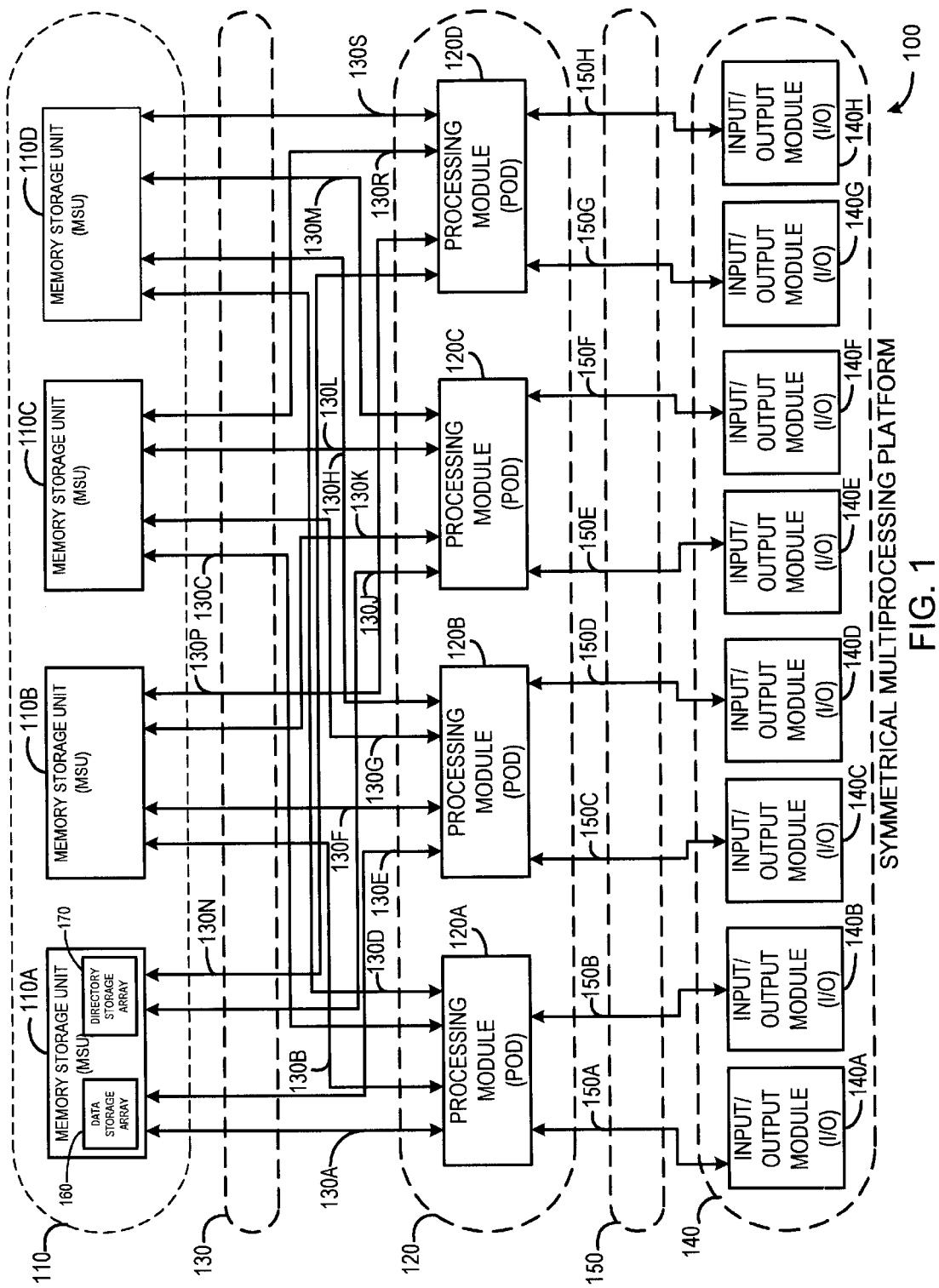
FIG. 1 is a block diagram of a Symmetrical Multi-Processor system platform according to one embodiment of the present invention.

FIG. 1 is a block diagram of a Symmetrical Multi-Processor System Platform according to a preferred embodiment of the present invention. System Platform 100 includes Memory Storage Unit (MSU) shown in dashed block 110, which comprises one or more MSU devices individually shown as MSU 110A, MSU 110B, MSU 110C and MSU 110D. The system further includes one or more Processing modules (PODs) in dashed block 120 individually shown as POD 120A, POD 120B, POD 120C, and POD 120D. Each unit in MSU 110 is coupled to a POD 120 via a dedicated, point-to-point connection referred to as an MSU Interface (MI) in dashed block 130, individually shown as 130A through 130S. For example, MI 130A interfaces POD 120A to MSU 110A, MI 130B interfaces POD 120A to MSU 110B, MI 130C interfaces POD 120A to MSU 110C, MI 130D interfaces POD 120A to MSU 110D, and so on.

Any POD 120 has direct access to data in any MSU 110 via one of MIs 130. For example, MI 130A allows POD 120A direct access to MSU 110A and MI 130F allows POD 120B direct access to MSU 110B. PODs 120 and MSUs 110 are discussed in further detail below.

System Platform 100 further comprises Input/Output (I/O) Modules in dashed block 140 individually shown as I/O Modules 140A through 140H. The I/O Modules provide the interface between various Input/Output devices or communications links and one of the PODs 120. Each I/O Module 140 is connected to one of the PODs across a dedicated point-to-point connection called the MIO Interface in dashed block 150 individually shown as 150A through 150H. For example, I/O Module 140A is connected to POD 120A via a dedicated point-to-point MIO Interface 150A.

Returning now to a discussion of MSU 110, each unit in MSU 110 is coupled to a POD 120 via dedicated, point-to-point MIs shown in dashed block 130. Each MSU Interface comprises separate bidirectional data and bidirectional address/command interconnections, and further includes unidirectional control lines that control the operation on the data and address/command interconnections (not individually shown). The data interconnections within MI 130 each include sixty-four bi-directional data bits, with additional data parity bits, data strobe lines, and error signals. In this exemplary embodiment, each data interconnection is therefore capable of transferring eight bytes of data at one time. The system is capable of performing eight sequential transfer operations of this nature such that a sixty-four byte data packet, or cache line, may be received from, or transferred to, another unit in the system during a high-speed memory operation.

MSU 110A is shown to include a Data Storage Array 160 and Directory Storage Array 170. Each of the other MSUs in the system includes similar memory structures, although, for simplicity, only those cache lines associated with MSU 110A are discussed. Data Storage Array 160, which is addressed in 64-byte cache lines discussed above, provides the main storage facility for Platform 100. For each of the cache lines stored in the Data Storage Array, associated status bits are stored in the Directory Storage Array 170. The status bits, referred to as the "Directory Storage Information Bits", record which entities within platform 100 have a copy of the associated cache line stored within a local cache memory. In one embodiment, the Directory Storage Information Bits record which one or more Third Level Caches (TLCs) within the system stores a copy of the cache line. This is discussed further below in reference to FIG. 3.

Whenever any read or request-for-write operation is performed to a cache line within the Data Storage Array 160, the Directory Storage Information Bits associated with that cache line are read from the Directory Storage Array 170. These bits are used to determine how the read or write operation should be processed. For example, these bits may indicate that the Data Storage Array may not contain the most recent copy of the requested cache line because a (possibly updated) copy of the cache line resides in one of the sub-units of a POD 120. Completion of the memory operation therefore requires that this other copy from POD 120 be retrieved and provided to the requester. The previous copy of the cache line that had been stored by POD 120 is marked as invalid and unusable. The Directory Storage Information Bits will be updated to reflect that the new requester has the copy of the cache line. The process that supports these operations is discussed further below.

Figure 2:
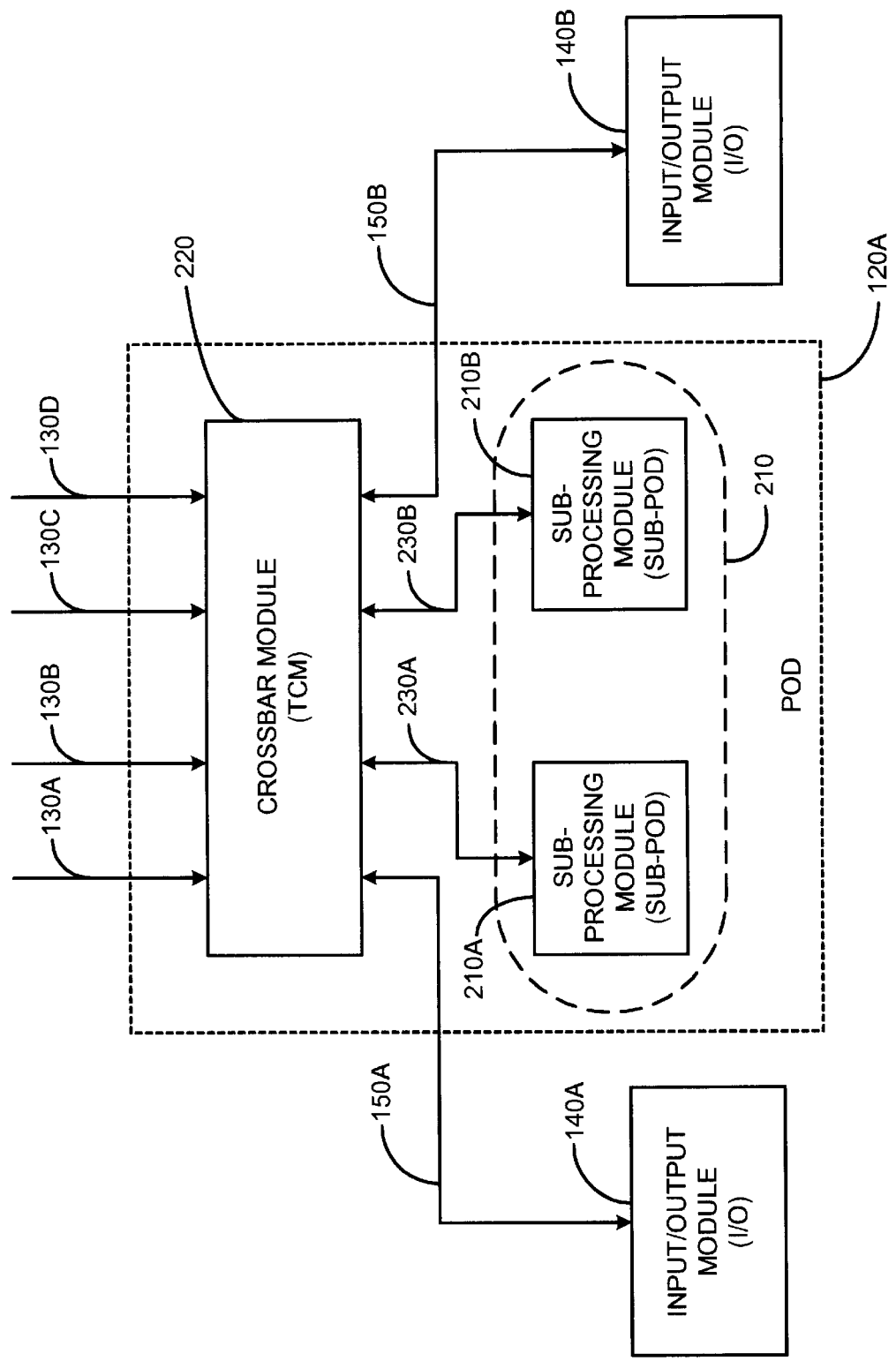
FIG. 2 is a block diagram of one embodiment of a Processing Module.

FIG. 2 is a block diagram of a processing module according to one embodiment of the present invention. POD 120A is shown, but each of the PODs 120A through 120D have a similar configuration. POD 120A includes two Sub-Processing Modules (Sub-PODs) in dashed block 210, individually shown as 210A and 210B. Each of the Sub-PODs 210A and 210B are interconnected to a Crossbar Module (TCM) 220 through dedicated point-to-point MT Interfaces 230A and 230B, respectively, that are similar to the MIs 130A, 130B, 130C, and 130D. TCM 220 further interconnects to one or more I/O Modules 140 via the respective point-to-point MIO Interfaces 150. TCM 220 both buffers data and functions as a switch between any of MT Interfaces 230A or 230B, or MIO Interfaces 150A or 150B, and any of the MI 130A through 130D. That is, TCM 220 selects one of Sub-PODs 210 or one of I/O Modules 140 to transfer data over MI Interfaces 130 at any given point in time. When an I/O Module 140 or a Sub-POD 210 is interconnected to one of the MSUs via TCM 220, the MSU connection is determined by the address provided by the I/O Module or the Sub-POD, respectively. In general, the TCM maps one-fourth of the memory address space to each of the MSUs 110A–110D.

According to one embodiment of the current system platform, TCM 220 can further be configured to perform address interleaving functions to the various MSUs. The TCM may also be utilized to perform address translation functions that are necessary for ensuring that each Instruction Processor (not shown in FIG. 2) and each I/O Module 140 views memory as existing within a contiguous address space.

In one embodiment of the present invention, I/O Modules 140 are external to Sub-POD 210 as shown in FIG. 2. This embodiment allows system platform 100 to be configured based on the number of I/O devices and communications links used in a particular application. In another embodiment of the present invention, one or more I/O Modules 140 is incorporated into Sub-POD 210.

Figure 3:
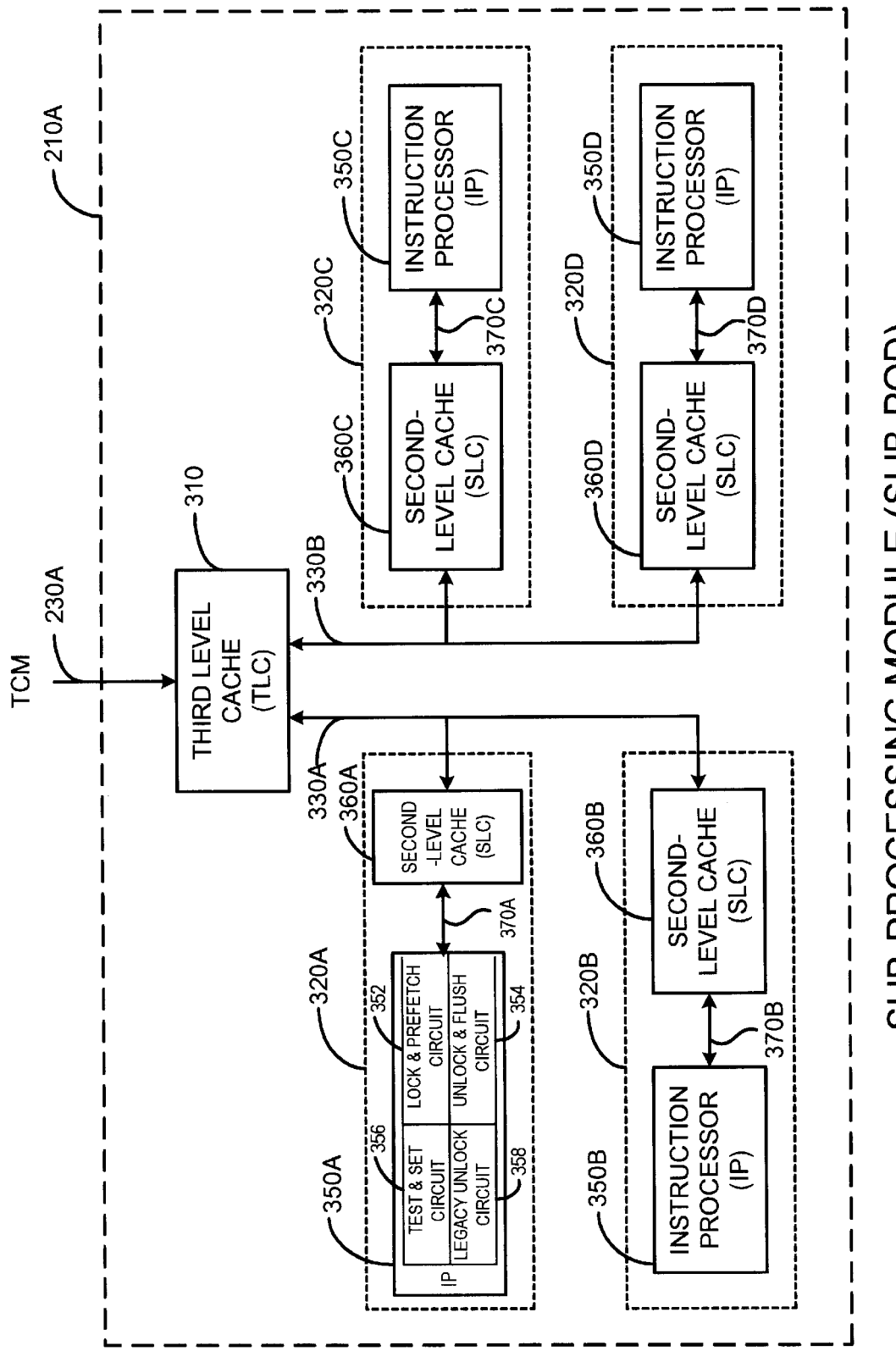
FIG. 3 is a block diagram of one embodiment of a Sub-Processing Module.

FIG. 3 is a block diagram of a Sub-Processing Module (Sub-POD) according to one embodiment of the present invention. Sub-POD 210A is shown, but it is understood that all Sub-PODs 210 have similar structures and interconnections. In this embodiment, Sub-POD 210A includes a Third-Level Cache (TLC) 310 and one or more Coherency Domains 320 (shown as Coherency Domains 320A, 320B, 320C, and 320D). A Coherency Domain 320 is a grouping of devices that can collectively gain access rights to data stored within MSU 110 in a manner to be discussed further below.

TLC 310 is connected to Coherency Domains 320A and 320B via Bus 330A, and is connected to Coherency Domains 320C and 320D via Bus 330B. TLC 310 caches data from the MSU, and maintains data coherency among all of Coherency Domains 320, guaranteeing that each processor is always operating on the latest copy of the data.

Each Coherency Domain 320 includes an Instruction Processor (IP) shown as IPs 350A, 350B, 350C, and 350D, and a Second-Level Cache (SLC), shown as SLCs 360A, 360B, 360C and 360D. Each SLC interfaces to an IP via a respective point-to-point Interface shown as Interfaces 370A, 370B, 370C, and 370D. Each SLC further interfaces to the TLC via one of Buses 330A and 330B. For example, SLC 360A interfaces to IP 350A via Interface 370A and to TLC 310 via Bus 330A. Similarly, SLC 360C interfaces to IP 350C via Interface 370C and to TLC 310 via Bus 330B. Each SLC caches data from the TLC as requested by the respective IP.

An IP such as IP 350A may be integrated with an SLC such as SLC 360A in a single device, such as in a Pentium Pro® Processing device available from the Intel Corporation. Alternatively, the IP may be an A-Series Instruction Processor or a 2200 Series™ Instruction Processor, both commercially available from the Unisys Corporation. The IP may be another other type of processing circuit known in the art. Furthermore, the IP may include a first-level cache.

In the system of the current invention, IP 350A is shown to include an inventive lock-and-pre-fetch circuit 352, an inventive unlock-and-flush circuit 354, a legacy test-and-set circuit 356, and a legacy unlock circuit 358 (FIG. 3). These circuits, which may be implemented in hardware, or any combination of hardware, microcode, and firmware, and may be included within any of the IPs of the system. These circuits will be discussed further below.

Before considering the specifics of the invention, a more detailed discussion of data coherency within an exemplary data processing system is needed. Data coherency involves ensuring that each IP and each I/O operates on the current copy of the data. Since multiple copies of the same data may exist within platform memory, including the copy in the MSU and additional copies stored in various I/O Modules, Third Level Caches 310, Second Level Caches, and/or First Level Caches, some scheme is needed to control which data copy is considered the "current" copy.

As discussed above, the exemplary Platform 100 uses a Directory Storage Array to maintain data coherency. The directory protocol of the preferred embodiment stores Directory Storage Information Bits for each of the cache lines stored in an MSU 110. This information is monitored and updated when a cache line is read or modified. The Directory Storage Information Bits includes information that indicates which "state" a cache line is in, and further indicates which TLC(s) or I/O Module may have a copy of the cache line.

A cache line "state" provides information about what access privileges are associated with the cache line, and further indicates which actions need to be taken by the MSU and the rest of Platform 100 before a request concerning a particular cache line may be granted. For example, the cache line data may have to be retrieved from one of the TLC or I/O Modules. In other cases, copies of the cache line may have to be invalidated within one or more TLC or I/O Modules before the MSU can provide the requested cache line to the requester.

Within the system of the current invention, a cache line is always in one of the following states, which are described further below:

MSU Owns;
Exclusive;
Shared;
I/O Copy;
I/O Exclusive;
Deferred; or
Error.

MSU Owns State

All cache lines in the MSU are placed in the MSU Owns State after system initialization and before any cache lines have been copied into one of the system caches. This is also the state a cache line enters after it is overwritten with new data received from an I/O sub-system such as disk or tape during an "Overwrite" operation. This state indicates that the MSU has the most recent copy of the cache line. Since only the MSU is considered to have a valid copy of any cache line that is in the MSU Owns State, an error occurs if any of the TLCs or I/O Caches attempts to write to the cache line while in this state.

Exclusive State

A POD may make a request to an MSU in order to modify a copy of a cache line. This request is made on behalf of a TLC 310 associated with that POD. When the TLC is provided with the requested cache line, the cache line transitions to the Exclusive State. The TLC receiving the cache line is said to be the "Owner" of that cache line, and has exclusive access rights. Only one cache may be the Owner of a cache line at once. No other cache may have a copy of the cache line while another cache is the Owner. Once the cache line enters the Exclusive State, the copy of the cache line within the MSU is no longer considered valid. When the MSU receives requests for a cache line that is in the Exclusive State, the MSU must retrieve the cache line copy from the Owner during what is referred to as a "Return" operation.

Shared State

A POD may also request a copy of a cache line for read-only purposes. When a cache line is copied to one of the TLCs for read-only purposes, the cache line state transitions to the Shared State. When in this state, the cache line may reside within one, several, or all of the TLCs 310 in Platform 100 at once. The MSU is still considered to have a valid copy of the cache, and may provide this cache line to a TLC making a further shared request. If a request is made for a shared copy of a cache line when another cache has an exclusive copy, the cache with the exclusive copy must return the cache line to the MSU and either invalidate its exclusive copy, or retain a shared copy.

I/O Copy State

Another read-only state is the I/O Copy State. In the I/O Copy State, the cache line may reside within one I/O Module 140 and no TLCs. As is the case with the Shared State, the MSU is still considered to have a valid copy of the cache line, and modifications may not occur to the cache line within the I/O Module. The coherency actions employed when a cache line is in this state are similar to those used when the cache line is in the Shared State.

I/O Exclusive State

The I/O Exclusive State allows an I/O Module to gain an exclusive copy of the cache line with read/write access rights, thereby becoming the cache line Owner. When the cache line is in this state, no other copies may exist within any other cache in the system.

Deferred State

A cache line may also be in the Deferred State, indicating that the cache line state is in transition. The Deferred State is entered when a request is made for a cache line that is either in the Exclusive or I/O Exclusive State. Since the MSU is not considered to have a valid copy of a cache line that is in either the Exclusive or I/O Exclusive States, the request is deferred until the Owner of the cache line returns access rights and/or the modified copy of the cache line to the MSU. Once the MSU issues a Function to the current Owner initiating the return of the cache line, the cache line must transition to this temporary state. Otherwise, the MSU would (erroneously) issue additional Functions to the current Owner if subsequent requests for this cache line were received before the return of the cache line is completed.

Error State

Finally, a cache line may also transition to the Error State. A cache line transitions to the Error State when the MSU receives an unexpected command. For example, if a cache line is in the MSU Owns State, the MSU should contain the only valid copy of the cache line within the Platform. Therefore, a command attempting to write the cache line from a cache to the MSU is considered an illegal and unexpected operation, and will cause the cache line to transition to the Error State. Once a cache line is in the Error State, it may not be accessed. It remains in the Error State until the MSU is re-initialized, or until an I/O Module 140 makes a request to write new data to the entire cache line during an I/O Overwrite operation.

Next, discussion turns to the commands used to request cache lines from MSU 110. As discussed above, when a TLC 310 makes a read request to an MSU 110 for a cache line, the state of Directory Storage Information Bits within Directory Storage Array 150 are updated. The new state of the cache line depends both on the type of request, and the identity of the unit that will obtain a copy of the cache line.

A request for a cache line is made by placing request data on predetermined ones of the address/command lines included within MI interface 130. Request data includes a "command" that indicates the type of access required by the requester. The identity of the requester is also provided. As discussed above, when the MSU receives a command from one of the PODs, the MSU may respond by issuing a Function to one or more of the PODs to cause some action to occur with respect to the cache line so that cache line coherency will be maintained.

Five types of Commands may be issued to the MSU to request a cache line: Fetches, Stores, I/O Commands, Special Commands, and Diagnostic Commands. Fetches generally request that data from the MSU be provided to a TLC. Stores indicate that data and/or access rights are being returned to the MSU by a TLC. The remaining types of commands are largely beyond the scope of the current invention, and will not be considered further.

A Fetch command is issued when an IP makes a request to a TLC 310 and a cache miss occurs. The TLC must then provide control signals that cause the POD to issue the appropriate Fetch Command to the MSU. Several types of fetch commands may be used within the context of an exemplary system that employs the current invention, as follows:

Fetch Copy Command

When an IP is reading a cache line to retrieve an instruction or data that is not present in its FLC, SLC, or TLC, the TLC makes a request that causes the associated POD to issue a Fetch Copy Command to the MSU. In response to this command, the MSU must obtain the latest copy of the cache line so that it can be provided to the requesting TLC. In some instances, for example, when the cache line is in the Shared or MSU Owns State, the MSU will already have the latest copy of the cache line. In other cases, the MSU must obtain the cache line and/or ownership rights from another unit. For example, the MSU will issue a Return-Copy Function to the TLC having exclusive copy of the cache line, thus causing this Owner TLC to return the exclusive access along with the updated cache line. It may be noted that the previous exclusive TLC may retain a shared copy of the cache line. Once the MSU has the most recent copy of the cache line data, a copy of the cache line is provided to the requesting TLC and the cache line is placed in the Shared State.

Fetch Original Command

If an IP requests write access for a cache line and a cache miss results within the associated TLC, the TLC makes a request which causes the associated POD to issue a Fetch Original Command to the MSU. As discussed above, the MSU must obtain the latest copy of the cache line so that it can be provided to the requesting TLC. If the cache line is in the MSU Owns State, the cache line and ownership rights may be provided directly to the requesting POD to be provided to the TLC. Otherwise, the MSU must obtain the cache line and ownership rights by issuing the appropriate function to the unit currently having exclusive copy of the cache line. If the cache line is in the Shared State, the MSU issues Purge Functions to each of the TLCs having a shared copy of the cache line so that the copies are invalidated. If the cache line is in the Exclusive State, the MSU issues a Return-Purge Function to the Owner TLC to cause the updated data to be returned to the MSU, and to cause invalidation of the cached copy. Upon obtaining the most recent copy of the cache line, the MSU provides it to the requesting TLC, and the cache line is placed in the Exclusive State and the new Owner is recorded.

Fetch Ownership Command

A Fetch Ownership Command is issued by a POD when an IP seeks to modify a shared copy of a cache line in the associated TLC. The MSU verifies that the cache line is in the Shared State, issues Purge Functions to all of the other TLCs having a shared copy of the cache line, and then provides the exclusive access to the requesting TLC. Since the data is already present in the cache, no data is transferred to the TLC.

As noted above, Fetch commands are used to retrieve cache lines from MSU 110. In contrast, Flush commands are used to store cache lines back to MSU 110. A POD generally issues a flush-type command when cache lines are aged from a TLC or an I/O Module. The following Flush Commands may be issued by a POD within the context of the current invention:

Flush Block Command

The most frequently used flush command is the Flush Block Command, which is used by a TLC to age out an entire cache line that has been modified within the TLC. In response to this command, the cache line copy is invalidated within the cache, the data is written back to the MSU, and the cache line state transitions to MSU Owns.

Flush NAK Command

A POD issues a Flush NAK Command when an unmodified cache line is aged from a TLC that had exclusive access privileges. Since the cache line has not been modified within the cache, no data is actually returned to the MSU, but the access privileges formerly held by the TLC are relinquished.

Flush Update Copy Command

A Flush Update Copy Command is issued to write a modified cache line from a TLC back to the MSU while allowing the TLC to keep a copy of the cache line with shared permission. The cache line state transitions from the Exclusive State to the Shared State when the MSU receives the cache line data and this command.

Flush NAK Copy Command

A Flush NAK Copy Command is issued by a POD when an associated TLC releases exclusive access rights, but maintains shared access rights, of an unmodified cache line. Since the cache line is unmodified, no data transfer is needed. The cache line state transitions from the Exclusive to the Shared State.

Flush Update Original Command

A POD issues a Flush Update Original Command when a TLC is providing the most recent copy of an updated cache line to the MSU, but is maintaining exclusive permission. The state of the cache line is not affected by this command.

Although other types of Commands may be utilized within an exemplary system employing the current invention, these other commands are largely beyond the scope of the current invention, and will not be discussed further. A detailed discussion of such commands may be obtained from co-pending application entitled "Directory-Based Cache Coherency System Supporting Multiple Instruction Processor and Input/Output Caches", referenced above. It would be appreciated that the above-described system is merely provided for discussion purposed and other coherency schemes and platform architectures, including Non-Uniform Memory Access (NUMA) Systems, may usefully employ the inventive system described herein.

III. Description of the Invention

The foregoing system description is provided to allow the user to better comprehend both the problems solved by, as well as the exemplary embodiments of, the current invention. The system set forth above is merely exemplary in nature, however, and many other type of systems may usefully employ the invention to be described in the following paragraphs.

The current invention is an improved system and method for implementing software-locks. A software-lock is needed when a thread requires extended access to one or more cache lines in memory. In such cases, merely gaining ownership of the required cache line(s) will not suffice since another requester within the system has the capability to take away those cache lines before the thread has completed its processing activities. This may produce undesirable results.

The foregoing problem may best be described by continuing the example set forth above. Assume a transaction processing system thread is executing on IP 350A of Platform 100. During the course of execution, the transaction processing system thread must access data stored within a cache line of MSU 110. Further assume that the requested cache line is not stored within SLC 360A or TLC 310, and TLC 310 must therefore make a request to MSU 110 for exclusive ownership of the cache line. The MSU returns ownership to TLC 310, which in turn, returns ownership to SLC 360A so that IP 350A can access the data. In this instance, the thread both reads, then updates, several bank account balances stored within the cache lines as may occur when funds are transferred between two bank accounts. Further, assume that the updates are only partially completed when SLC 360A is forced to relinquish ownership of a cache line because another IP in the system, in support of the thread it is executing, requested the cache line ownership. If the cache line is returned to MSU 110 at this time, a transaction error will occur since some, but not all, of the bank account updates have been completed such that the accounts may be either under-funded or over-funded.

To prevent the foregoing situation from occurring, the thread directs the IP to execute a lock-type instruction. A lock-type instruction performs an atomic Read-with-lock-Test-optionally-Modify-Release-lock operation to activate, or "lock", a software-lock if that the software-lock is not already active because of a previous software-lock request issued by another thread. The software-lock is a predetermined location within the memory system that, by software convention, is understood to "protect" certain data or one or more programs within the memory system. Only one thread may have access to the associated protected data or programs while the software-lock is active. No other threads may gain access to the protected data or programs until the software-lock is "unlocked", or inactive. In this manner, access to the protected data or programs is guaranteed until all processing activity is completed. An improved mechanism for providing lock capabilities is discussed in the following paragraphs.

Figure 4:
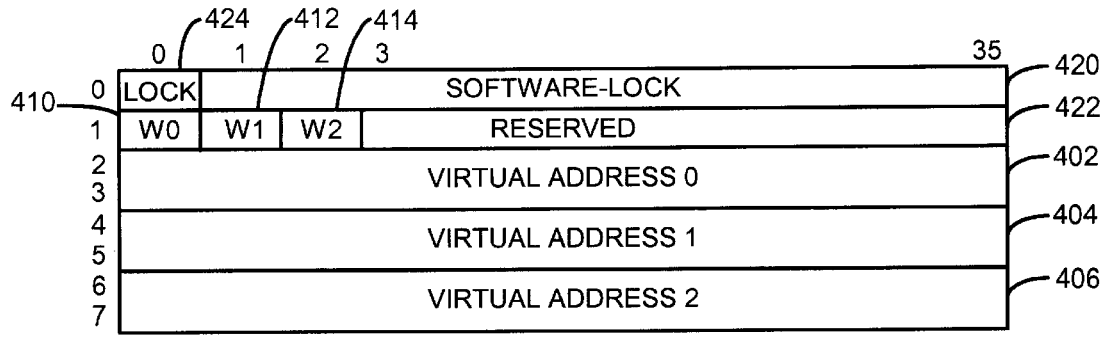
FIG. 4 is a diagram of a data packet including a lock cell according to one embodiment of the current invention.

FIG. 4 is a diagram of data packet 400, which is used to implement a lock according to one embodiment of the current invention. Data packet 400 contains cache line address information shown as Virtual Address 0, 402, Virtual Address 1, 404, and Virtual Address 2, 406. Each of these Virtual Addresses may point to a cache line that is to be protected by the software-lock. Although in the current exemplary embodiment, up to three cache lines may be associated with the lock-type instruction, other embodiments may be implemented using more or fewer cache lines.

Each of the cache lines associated with the software-lock may be accessed in either a shared state (read-only) or an exclusive state (read/write). When a cache line is accessed in a shared state, the requesting IP may only read the cache line data. In contrast, a cache line accessed in an exclusive state may be read and/or updated. The information that records the state of a cache line is maintained in directory storage array 170 of MSU 110, as discussed above.

A cache line is copied into an IP's SLC using the state indicated by a respective one of state bits W0, 410, W1, 412, and W2, 214 of data packet 400. For example, bit W0, 410, corresponds to Virtual Address 0, 402. If bit W0 is set, indicating read/write access is required, the cache line pointed to by Virtual Address 0 is loaded in the Exclusive state. If this bit is clear, the cache line is loaded in the Shared state since only read-only access is needed. Similarly, bits W1 and W2 correspond respectively to Virtual Addresses 1 and 2 and are used in a like manner.

Data packet 400 further includes a software-lock 420. This software-lock may include a lock indicator 424 that may be set using a lock-type instruction. Depending on the indicator value, the software-lock this cell implements is either active or inactive. Finally, data packet has a reserved field 422 that is provided for future use. The use of data packet 400 during instruction execution will become apparent from examples set forth below.

As noted above, various lock-type instructions may be used with the current invention. For example, a Lock-and-Pre-Fetch-and-Skip instruction may be employed by the thread to attempt to activate a software-lock 420. In this case, an unsuccessful lock attempt results in either another attempt to activate software-lock 420, or the execution of other routines. A similar instruction called a Lock-and-Pre-Fetch instruction may be used in the alternative. This latter instruction performs a single lock attempt on the lock cell and generates an interruption to the operating system should the attempt be unsuccessful. These instructions are discussed further below.

Figure 5:
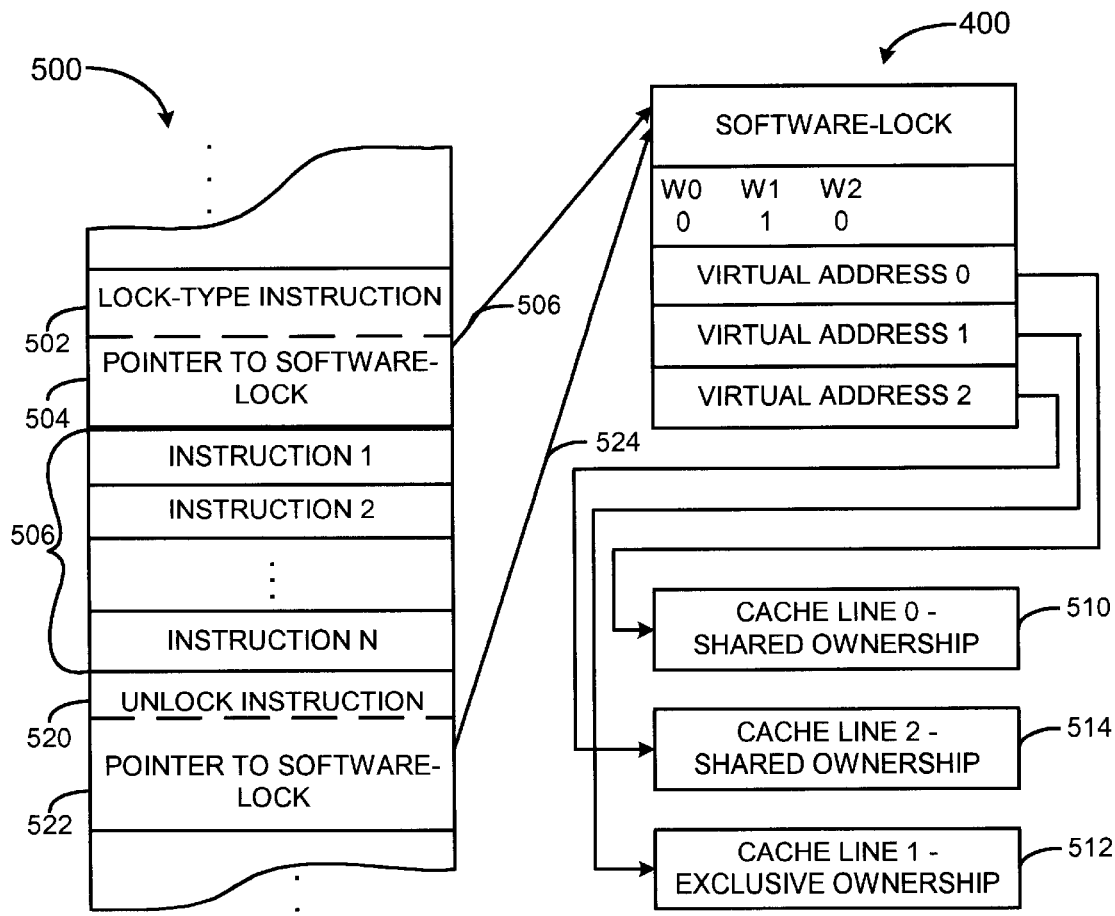
FIG. 5 is a block diagram illustrating the manner in which the data packet of FIG. 4 is used within the context of the current invention.

FIG. 5 is a block diagram illustrating the manner in which data packet 400 is used within the context of the current invention. Assume that instruction sequence 500 is being executed by an IP. This instruction sequence, or "code snippet", is a series of programmed machine instructions as is known in the art. Upon the first reference to this instruction sequence, the instructions may be copied from MSU 110 to a TLC 310, and finally to the executing IP's SLC 360 and FLC. This may be accomplished by a Fetch Copy command to copy the cache lines of instruction sequence 500 as the instructions are referenced. As is known in the art, caching instructions and data in this way provides for much faster execution time than if the instructions and operands remain stored within MSU 110.

Assume that IP 350A is executing the instruction sequence 500 that has been cached within SLC 360A. During execution, IP 350A encounters a Lock-type instruction 502 according to the current invention. This instruction, which for exemplary purposes will be considered a Lock-and-Pre-Fetch-and-Skip instruction, may be included within the machine instruction set of the exemplary system. The instruction includes a pointer 504 to data packet 400, as indicated by arrow 506. This pointer is used to retrieve data packet 400.

The cache line that includes data packet will not generally reside within the requesting IP's SLC 360 or the associated TLC 310, but instead must be retrieved from MSU 110 or from another TLC in the system. IP 350A issues a Fetch Original command to copy the cache line of the data packet 400 to the SLC 360A with exclusive access. Assuming the cache line is owned by the MSU, it may be retrieved and transferred to SLC 360A. Otherwise, the MSU must acquire the cache line from the previous requester before it can be transferred to SLC 360A. In either event, exclusive ownership of the cache line must be acquired by TLC 310 and then passed to SLC 360A, since read/write access is needed to execute the lock-type instruction.

Once the cache line is stored within the requesting IP's SLC 360, which in this example is SLC 360A, software-lock 420 is retrieved. During execution of the Lock-type instruction by lock-and-prefetch circuit 352 (FIG. 3), IP 350A tests the state of lock indicator 424. If lock indicator 424 is in the cleared state, indicating that the software-lock is available for use, this indicator is set to activate the software-lock, by software convention giving the thread sole access to the protected data. This is performed as an atomic operation so that no other requester can gain access to lock cell after the testing, but before the setting, operations occur. For discussion purposes, it will be assumed the lock indicator is set, indicating that the lock has already been activated by another thread.

If the lock indicator is set, instruction execution flow depends on whether a Lock-and-Pre-Fetch or a Lock-and-Pre-Fetch-and-Skip instruction is being executed. In the current example, it is assumed a Lock-and-Pre-Fetch-and-Skip operation is being executed such that an unsuccessful attempt to activate the software-lock is followed by executing the next instruction in the instruction sequence. Continued instruction execution may lead to performing additional lock attempts until the software-lock is eventually activated by the executing thread. This may be accomplished by modifying the instruction execution path to include an execution loop, or by setting a status variable to indicate the lock attempt failed so that later testing of this variable can be performed to direct execution flow. If the software-lock is activated, the instruction following the Lock-and-Pre-Fetch-and-Skip instruction is skipped to indicate successful activation of the software-lock. This skip operation may be accomplished by incrementing the program address counter of the IP by a predetermined amount.

In contrast to Lock-and-Pre-Fetch-and-Skip instructions, Lock-and-Pre-Fetch instructions are executed such that an unsuccessful attempt to activate the software-lock causes an interruption to be generated to the operating system. The manner in which the interruption is handled is a matter of design choice. In some embodiments, for example, the unsuccessful operation could be attempted again at a later time.

Returning again to the present example, the lock attempt by the exemplary thread executing on IP 350A was unsuccessful in activating the software-lock because another thread has already activated the software-lock. Lock-and-Pre-Fetch-and-Skip instruction execution may cause the exemplary thread to execute in a-code loop that includes the lock-type instruction. In each execution of the loop, IP 350A tests lock indicator 424 to determine whether the software-lock may be activated by the thread. The software-lock cannot be activated by the thread, however, until the thread that previously activated the software-lock deactivates the software-lock.

Next, assume that the thread that previously activated the software-lock is now ready to unlock that resource. To do this, the IP executing this thread (referred to as the "activating IP" for discussion purposes) must execute an Unlock-and-Flush using unlock-and-flush circuit 354 (FIG. 3). Assuming the activating IP's SLC does not already have exclusive ownership of the cache line including the lock cell, instruction execution causes a request to be issued to MSU 110 to obtain that exclusive ownership. Recall that in the current example, ownership of this software-lock cache line was given to SLC 360A so that IP 350A could execute the lock-type instruction in the manner discussed above. Therefore, the request to the MSU 110 from the activating IP will result in the MSU issuing a function to TLC 310 forcing return of the cache line. The MSU may then forward that data to the activating IP so that Unlock-and-Flush instruction execution may continue.

Execution of the Unlock-and-Flush instruction proceeds by clearing lock indicator 424. Next, the IP hardware retrieves the addresses of each cache line associated with the lock cell. For those cache lines that are exclusively owned, a command is issued to the associated SLC 360 to cause the cache lines to be returned to the TLC, and to then be flushed back to MSU 110 using a flush block operation. Additionally, the cache line that includes the lock cell is also flushed back to MSU 110. For cache lines that were accessed as a shared copy, the data may be retained in the SLC or, alternatively, may be flushed back to MSU 110.

After ownership of the cache line containing the lock cell is returned to MSU 110, another thread may attempt to activate the software-lock. Returning to the current example, execution of a Lock-and-Pre-Fetch-and-Skip instruction by the thread executing on IP 350A initiates another attempt to acquire the lock such that a request for exclusive ownership of the associated cache line is issued to MSU 110. If no other requests for this cache line are pending, MSU 110 provides the cache line copy along with exclusive ownership to TLC 310, which forwards the exclusive copy to SLC 360A.

Once the exclusive cache line copy resides within SLC 360A, processing of the Lock-and-Pre-Fetch-and-Skip instruction may continue according to the current example. The Lock-and-Pre-Fetch-and-Skip instruction operates to test, then set, lock indicator 424 as an atomic operation. After IP 350A successfully activated the software-lock, the IP hardware retrieves the virtual addresses stored within data packet 400. In the current embodiment, this involves retrieving Virtual Address 0, 402, Virtual Address 1, 404, and Virtual Address 2, 406, although additional addresses may be included in another embodiment.

As noted above, the Virtual Addresses reside within the same cache line of memory as the lock cell. Therefore, the retrieval of these addresses will not likely result in a cache miss. However, in rare circumstances a cache miss may occur because another thread within the system has gained access to the cache line and is attempting to activate the software-lock. In this instance, the lock-type instruction may cause another request to be made to re-gain access to the software-lock cache line so the Virtual Addresses may be retrieved. In another embodiment of the invention, pre-fetching of the cache lines is ignored when a cache miss occurs during retrieval of the Virtual Addresses. In yet another embodiment of the invention, lock-and-prefetch circuit 352 retains a copy of the Virtual Addresses when activating the software-lock. These addresses may then be used for prefetching the cache lines.

Each of the virtual addresses retrieved from data packet 400 may point to a cache line of memory. These addresses may, in the current embodiment, be 36-bit or 72-bit virtual addresses, with a 36-bit address having a zero value stored within the most significant address word. If both words of the address are set to zero, the address is unused and is ignored.

In addition to retrieving the virtual addresses, the IP further retrieves the associated state bits W0, 410, W1, 412, and W2, 414. Each of these bits is associated with a respective one of the virtual addresses in the manner discussed above. Based on the state of these bits, lock-and-prefetch circuit 352 makes successive requests to SLC 360A for access to the addressed cache lines. If a state bit is set, indicating exclusive access is required for the cache line, IP 350A requests exclusive ownership for the associated cache line. Similarly, the IP requests shared access for those cache lines associated with a state bit that is cleared, indicating shared access is sufficient. It should be noted that the IP hardware causes these requests to be issued to the SLC 360A without waiting for a response from the SLC. That is, the SLC receives and queues these requests without returning any acknowledgement to the IP regarding cache line availability. This allows the IP to continue executing subsequent instructions within the instruction sequence 500 even if the requested cache lines are unavailable within the SLC 360A. This execution will continue unimpeded for those instructions that do not require access to the requested cache lines.

After SLC 360A receives the requests for the cache lines indicated by data packet 400, the SLC determines whether a cache miss occurred. The cache miss may involve not having a copy of one or more of the requested cache lines, or may instead involve having access rights that are not adequate to fulfill the request. If a cache miss occurs, a request is made to TLC 310 for appropriate access rights to the associated cache line. In turn, TLC 310 may be required to request the data from MSU 110. If exclusive ownership is required, POD 120A may issue a Fetch Original to acquire the cache line data as well as exclusive ownership, or a Fetch Ownership command to acquire exclusive ownership for shared data that already resides within TLC 310. If shared access is sufficient for a required cache line, POD 120A may instead issue a Fetch Copy command to MSU 110 to request a shared copy of the cache line.

If MSU has ownership of the requested cache lines, these cache lines will be returned immediately to TLC 310 and the state bits within directory storage array 160 will be updated to the appropriate state. Otherwise, the MSU must request that one or more of the requested cache lines be returned by their respective owners so that the cache lines may be provided to TLC 310. It may be noted that although it is theoretically possible for another requester to gain access to the cache lines protected by the software-lock, in practice, this should never occur. This is because all software threads that use the software-lock conform to a software convention. This convention dictates that cache lines protected by the software-lock are never obtained from MSU 110 until the software-lock is activated by the executing thread. Similarly, modified cache lines are returned to MSU 110 when the software-lock is deactivated. Therefore, cache lines associated with a newly activated software-lock should either be on their way to MSU 110 following execution of an Unlock-and-Flush instruction, or should already be available within the MSU.

While TLC 310 is making any necessary requests for cache lines protected by the software-lock, IP 350A is able to continue execution. This is because execution of a lock-type instruction of this invention allows one or more cache line requests to be issued without forcing the IP hardware to wait for an acknowledgment from SLC 360A. Therefore, IP 350A may continue execution of the various instructions, shown as instructions 1 through N 506, in instruction stream 500. Execution stalls only when IP 350A begins execution of an instruction that requires access to a cache line that is not within SLC 360A. This may occur, for example, when one of the cache lines protected by the software-lock is accessed before it has been returned to SLC 360A by MSU 110.

Eventually, the cache lines protected by the software-lock are resident in contiguous or non-contiguous memory locations within SLC 360A. In one embodiment, three such cache lines are pre-fetched in this manner, although more or fewer cache lines may be protected by the software-lock as described above. In FIG. 5, these cache lines are illustrated as Cache Line 0, 510, Cache Line 1, 512, and Cache line 2, 514. The ownership rights returned with the cache lines are dictated by state bits 410, 412, and 414 in the manner discussed above, and as shown in FIG. 5. For example, Cache Lines 0 and 2 are returned with shared access since state bits 410 and 414 are cleared. In contrast, Cache Line 1 is returned with exclusive ownership because state bit 412 is set.

After the cache lines protected by the software-lock are resident within SLC 360A, the thread executing on IP 350A may perform any necessary read and/or write operations to this data. When these operations have been completed, the thread on IP 350A executes an Unlock-and-Flush instruction 520. This instruction, like the lock-type instructions, includes a pointer 522 to data packet 400, as shown by arrow 524. This pointer is used to access data packet 400 to clear lock indicator 424 in order to denote deactivation of the software-lock, and the cache line virtual addresses may be retrieved. The IP inventive unlock circuit then issues successive flush commands to SLC 360A to flush any of the cache lines pointed to by Virtual Addresses 0 through 2 that are associated with exclusive ownership. In this example, a flush command of this nature is issued for Cache Line 1, 512. Additionally, a flush command is issued for the cache line including data packet 400. Copies of cache lines 510 and 514 that were retained with shared access may remain in SLC 360A, or may optionally be flushed to MSU 110. When the SLC receives the flush commands, SLC 360A returns the cache line data to TLC 310. In turn, TLC 310 issues flush block commands to return the cache lines and all ownership rights to MSU 110.

In the above-described Unlock-and-Flush scenario, it is assumed that the lock cell cache line remains resident within an SLC after flushing the data packet cache line. In some instances, however, it may be possible to lose that cache line after the unlock operation is completed, but prior to performing the flush operations. This may occur, for example, because of a request made by another IP within the system. One method for handling this situation involves requesting the lock-cell cache line again so that the Virtual Addresses may be obtained for the flush operations. This may be time-consuming, however, since the IP that has acquired the cache line may have activated the software-lock and already begun pre-fetching the protected data cache lines. In another embodiment, unlock-and-flush circuit 354 retains a copy of the Virtual Addresses when deactivating the software-lock to use for flushing the cache lines. In yet another embodiment, flushing of the cache lines may be ignored in this instance.

For both the pre-fetching and flushing of the virtual addresses identified in the data packet, any error associated with the address is suppressed during the pre-fetch or flush. Error examples include invalid address, address associated with a cache line in an Error state, or a page fault on the address.

The system and method described above provides important performance benefits over previous locking conventions. In prior art systems, data protected by a locking mechanism is not pre-fetched unless that data resides within the same cache line as the lock cell. As a result, after the software-lock is acquired, time is wasted because the protected data is not resident in cache. Each time a cache miss occurs, the processor is in a stalled state waiting for return of the data. Even if a requested cache line is owned by a main memory such as MSU 110, the request requires many instruction cycles to complete. This time is increased if the cache line must be retrieved from another TLC within the system.

The current invention solves the foregoing problem by issuing requests for the protected cache lines immediately after the software-lock is activated, regardless of when the data will be accessed. Because these requests do not place the IP in a stalled state, but instead allow it to continue execution, processing throughput is dramatically increased. The IP is only impacted if execution of an instruction causes protected data to be accessed before it is returned from MSU 110. Even in this case, since the request for the cache line has already been issued, the data will be provided sooner than if the request were not issued until an instruction accessed the protected data.

The current system provides additional advantages by separating protected data from the lock cell itself. That is, lock cell 424 resides within a different cache line than does the protected data, which in the above example, is stored within cache lines 510 through 514. As a result, an attempted software-lock activation by a second thread will not require a thread with the software-lock already activated to discontinue accessing the protected data. In contrast, in prior art systems that include protected data in the same cache line as the lock cell 420, accesses to that protected data must temporarily cease when another processor obtains cache line ownership to execute a lock-type instruction. This type of cache thrashing decreases processing throughput and also consumes data path bandwidth.

In addition to the foregoing, the inventive system and method further minimize impact on processing by providing an efficient way to flush the protected cache lines back to MSU 110 following software-lock deactivation. This increases the probability that MSU 110 has ownership of these cache lines when the next request for the protected data is received. This minimizes the path length that is associated with data retrieval. In prior art systems, protected cache lines may remain resident within a previous owner's SLC. In this case, a subsequent request to activate the software-lock can only be completed after MSU 110 obtains the data from the previous requester.

Figure 6:
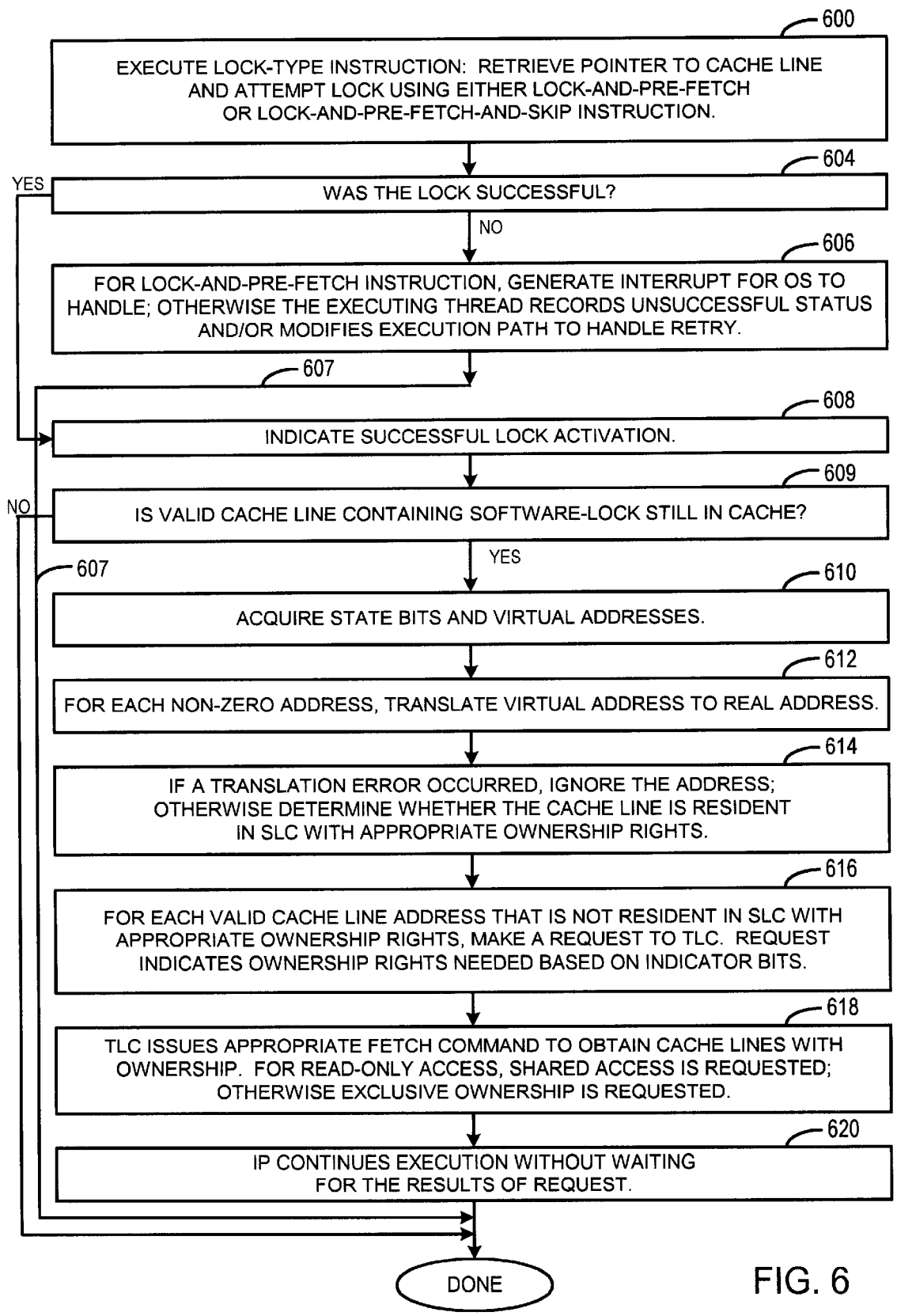
FIG. 6 is a flow diagram illustrating a method for performing a lock instruction according to the current invention.

FIG. 6 is a flow diagram illustrating the method for performing a lock instruction according to the current invention. First, a lock-type instruction is executed by the inventive lock circuit 352 of an IP (600). In the current embodiment, this may include the Lock-and-Pre-Fetch or the Lock-and-Pre-Fetch-and-Skip command. A pointer within this instruction is used to obtain data packet 400 that includes the lock cell so that the software-lock may be attempted. If the software-lock is successfully activated (604), execution continues with step 610.

If the software-lock activation attempt is unsuccessful, execution continues based on the type of instruction that was attempted (606). For a Lock-and-Pre-Fetch instruction, an interrupt is issued to the operating system to indicate the unsuccessful attempt. This may optionally cause a retry operation to occur later, depending on the operating system software implementation. For a Lock-and-Pre-Fetch-and-Skip, the instruction provides an indicator that the software-lock was previously activated by another thread. On unsuccessful indication, the thread determines whether to retry or do other processing. After the unsuccessful attempt is handled in one of the foregoing ways, instruction execution is completed, as indicated by arrow 607.

After a software-lock has been activated, successful software-lock activation is indicated (608). Next, if it is determined that the data packet cache line is no longer valid in the cache, the instruction may be exited (609). Otherwise, if the data packet cache line is in cache, the various data items stored in the data packet cache line are obtained, including the state bits, and the virtual addresses (610). If a virtual address is set to zero, it may be ignored. Otherwise, the address is translated using a process that may be performed in hardware and/or firmware (612). In a manner that is beyond the scope of the current invention, address translation generates a real address that can be used to retrieve a respective cache line. If an error occurs during the process, the address is ignored and all subsequent addresses may also be ignored. Otherwise a determination is made as to whether the real address is resident within the IP's SLC, and whether the appropriate access rights have been granted (614).

In many, if not most, instances, the cache lines protected by the software-lock will not reside within the SLC. In these instances, a request is made to the TLC to obtain the cache lines and the necessary access rights, as is determined by the state bits (616). If the TLC does not have a copy of the cache line with the desired access rights, the TLC issues a command to MSU 110 to return the cache lines and access rights. If read/write access is requested, an exclusive copy is required. Otherwise, a shared copy is sufficient (618).

After the IP hardware makes the initial requests to the SLC for the cache lines, the IP may continue execution (620). The IP is not required to wait for return of the requested cache lines. IP execution will only be impacted by a cache miss if the requested cache line(s) are not resident within the SLC when a later instruction accesses the cache line(s).

Figure 7:
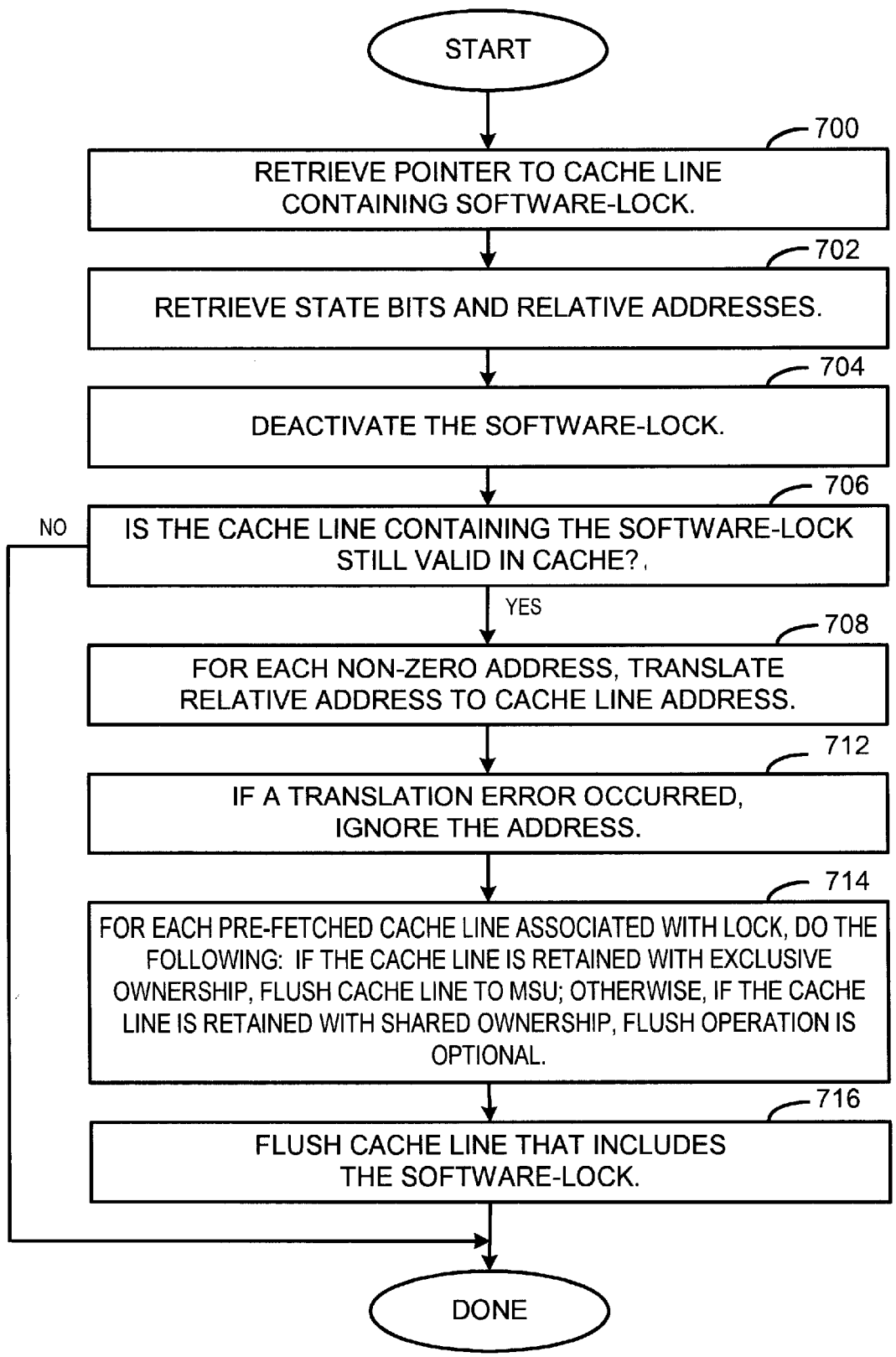
FIG. 7 is a flow diagram illustrating a method for performing a unlock instruction according to the current invention.

FIG. 7 is a flow diagram illustrating a method for performing an Unlock-and-Flush instruction according to the current invention. The Unlock-and-Flush instruction execution is supported by unlock-and-flush circuit 354 (FIG. 3). First, the pointer to the cache line containing data packet 400 is retrieved (700). Lock indicator 424 (FIG. 4) is then cleared to deactivate the software-lock (704). Next, if the data packet cache line is invalid in the cache such that the virtual addresses cannot be retrieved, exit the instruction (706).

If the data packet cache line is in cache, the various data items stored in the data packet cache line are retrieved, including the state bits, and the virtual addresses. If a virtual address is set to zero, it may be ignored. Otherwise, the address is translated using a process that may be performed in hardware and/or firmware (708). If an address translation error occurs during this process, the associated cache line may be ignored (712).

Next, execution flow continues in a manner that is determined by the type of ownership rights that have been acquired for that cache line. For example, if the cache line is being retained with exclusive ownership, a cache line flush is initiated to return the updated cache line and all ownership rights. This can be accomplished, for example, by returning the cache line to the TLC, which, in turn, issues a Flush Block command to the MSU 110. If the cache line is being retained with shared access, the cache line may, but need not, be flushed. In one embodiment, the cache line may be flushed to make more room in the cache (714). The cache line that includes the data packet is also flushed to the MSU to return both data and all ownership rights (716). For each of the cache lines that the IP requested the SLC to flush that is not in the cache, the SLC will not generate the respective flush request.

The locking scheme disclosed herein is compatible with older, legacy Test-and-Set type instructions such as Test-and-Set-and-Skip, Test-and-Set, and Unlock instructions, which are respectively similar to Lock-and-Pre-Fetch-and-Skip, Lock-and-Pre-Fetch, and Unlock-and-Flush. That is, the inventive instructions described herein are capable of activating a software-lock of the type provided on legacy systems. These legacy instructions are executed by the legacy test-and-set circuit 356 and the legacy unlock circuit 358 (FIG. 3). Conversely, the legacy instructions are capable of activating the inventive software-lock described herein.

Using the inventive instructions provided herein in conjunction with legacy instructions maintains complete data integrity. However, this mixing of instruction types may result in increased cache thrashing and cache line access delays. This is because the legacy Test-and-Set type instructions, which may be of the type available on 2200-series™ systems commercially available from Unisys Corporation, do not pre-fetch or flush protected cache lines and, as a result, have lower system performance. Moreover, the inventive lock-type instructions disclosed herein will incorrectly interpret legacy data as including cache line addresses. This will result in unnecessarily pre-fetched and flushed cache lines. It may further result in data within the lock cell being interpreted as one or more "illegal" addresses, which are ignored by the system. Thus, even though data integrity is maintained even when instruction types are mixed, best performance occurs when all users of a software-lock employ the Lock-and-Pre-Fetch-and-Skip, Lock-and-Pre-Fetch, and Unlock-and-Flush instructions with the new lock cell format 400.

The compatibility provided by the ability to use both legacy instructions along with the inventive instructions described herein simplifies moving from legacy to newer systems. As described above, if use of the new instructions on legacy data results in an illegal address, both the error and either the pre-fetch or the flush command is discarded so that operation continues. Similarly, if the lock data is updated to a data packet as described herein including cache line addresses, legacy programs may still employ test-and-set and unlock type instructions to activate and deactivate the software-lock, but no pre-fetching and flushing will occur. Thus, legacy programs can be upgraded to those that use the new, inventive locking instructions on an individual basis. Similarly, the lock cells can be upgraded individually, if desired, to include the inventive data packets described herein.

The ability to upgrade programs and lock cells on an individual basis is very important. In some systems, many code elements may have the ability to activate a particular software-lock, but only a few of these code elements account for almost all of the software-lock activations that actually occur. By upgrading only the select elements to employ the novel lock-type instructions and the lock packets described herein, very substantial performance gains are achieved. Changing the remaining code elements to use the inventive lock-type instructions is unnecessary since no measurable performance benefit would be obtained. In this way, important performance gains can be achieved without the expenditure associated with upgrading all, or even most, of the code elements.

Figure 8:
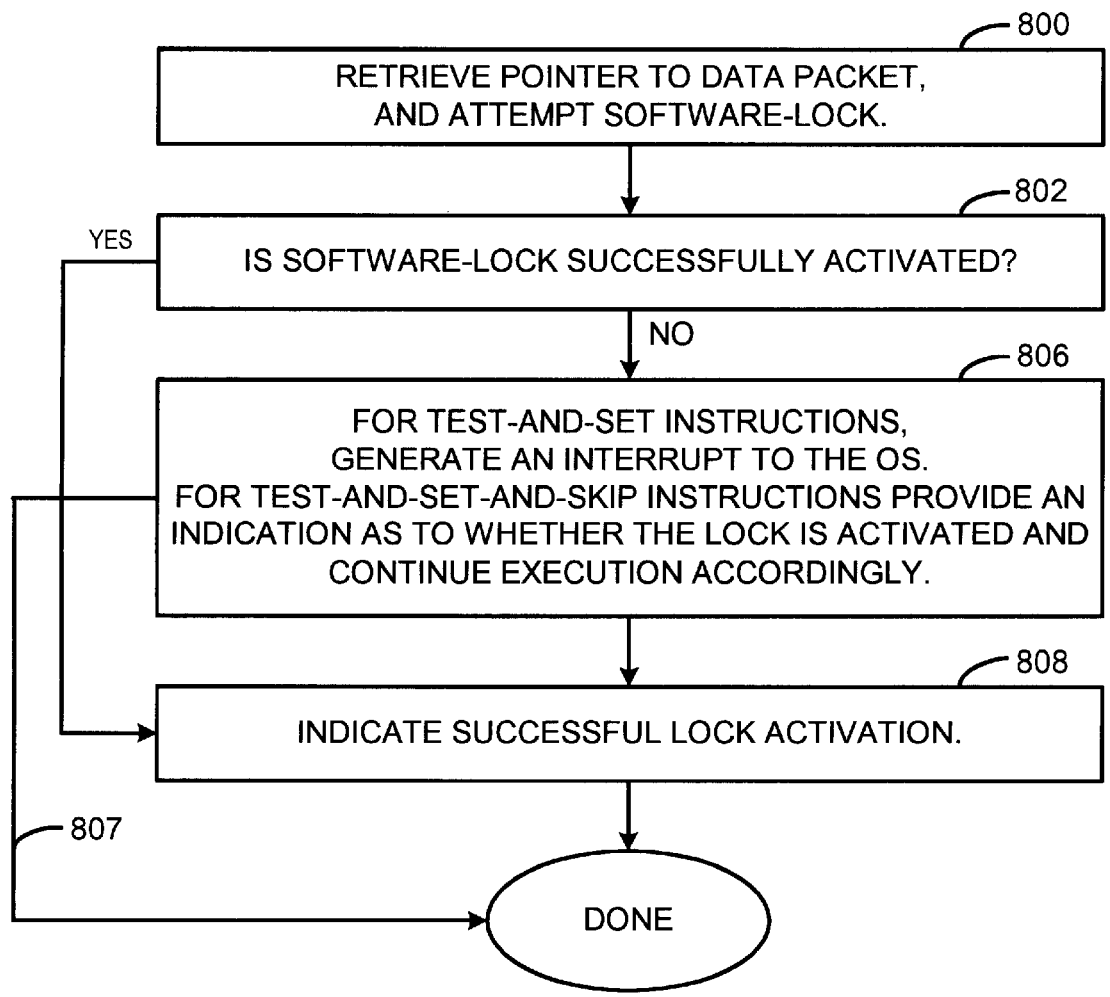
FIG. 8 is a flow diagram illustrating a method for executing a legacy test-and-set on a data packet including a software-lock as described herein.

FIG. 8 is a flowchart illustrating a method for executing a legacy test-and-set on a data packet 400. As discussed above, an instruction of this type may include the Test-and-Set-and-Skip or the Test-and-Set instructions of the type supported on 2200 systems commercially available from Unisys Corporation. According to this method, a pointer within the instruction is used to obtain data packet 400 that includes the lock cell so that the software-lock may be attempted (800). If the software-lock is successfully activated (802), execution continues with step 808.

If the software-lock activation attempt is unsuccessful, execution continues based on the type of instruction (806). For a Test-and-Set instruction, an interrupt is issued to the operating system to indicate the unsuccessful attempt. This may optionally cause a retry operation to occur later, depending on the operating system software implementation. For a Test-and-Set-and-Skip, the instruction provides an indication as to whether the software-lock was successfully activated. If it was successful, the next instruction is skipped. Otherwise, the next instruction is executed, and the thread determines whether to retry the instruction or continue with other processing activities. After the unsuccessful lock attempt is handled in one of the foregoing ways, instruction execution is completed, as indicated by arrow 807.

After a software-lock has been activated, successful software-lock activation is indicated (808). It may be noted that the method of FIG. 8 ignores all data in the data packet except the lock cell.

Figure 9:
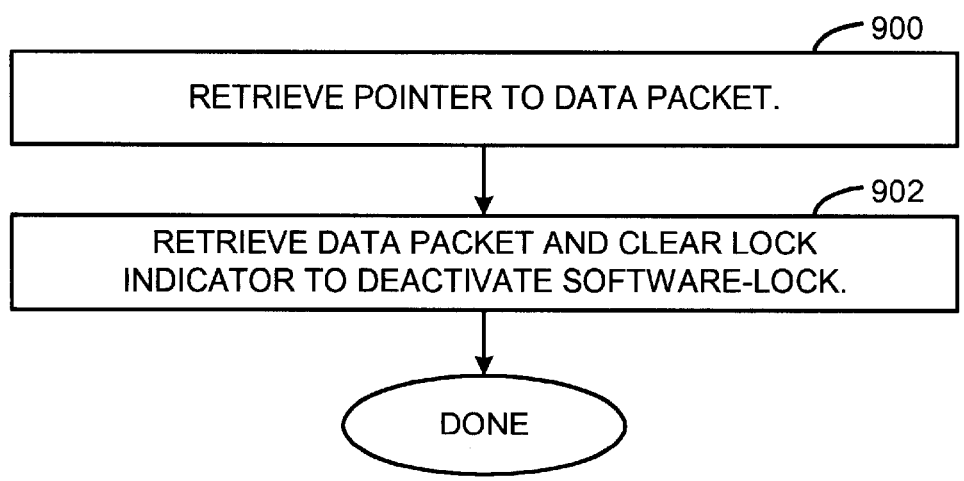
FIG. 9 is a flowchart illustrating a method of executing a legacy unlock operation performed on an data packet including a software-lock as described herein.

FIG. 9 is a flow diagram illustrating a method of executing a legacy unlock operation performed on a data packet of the type described herein. The unlock instruction execution is supported by legacy unlock circuit 358. According to this method, the pointer to the cache line containing the data packet 400 is retrieved (900). The data packet cache line is then retrieved, and lock indicator 424 is cleared to deactivate the software-lock (902). Note that the legacy unlock instruction ignores all data in the data packet except the lock cell.

Figure 10:
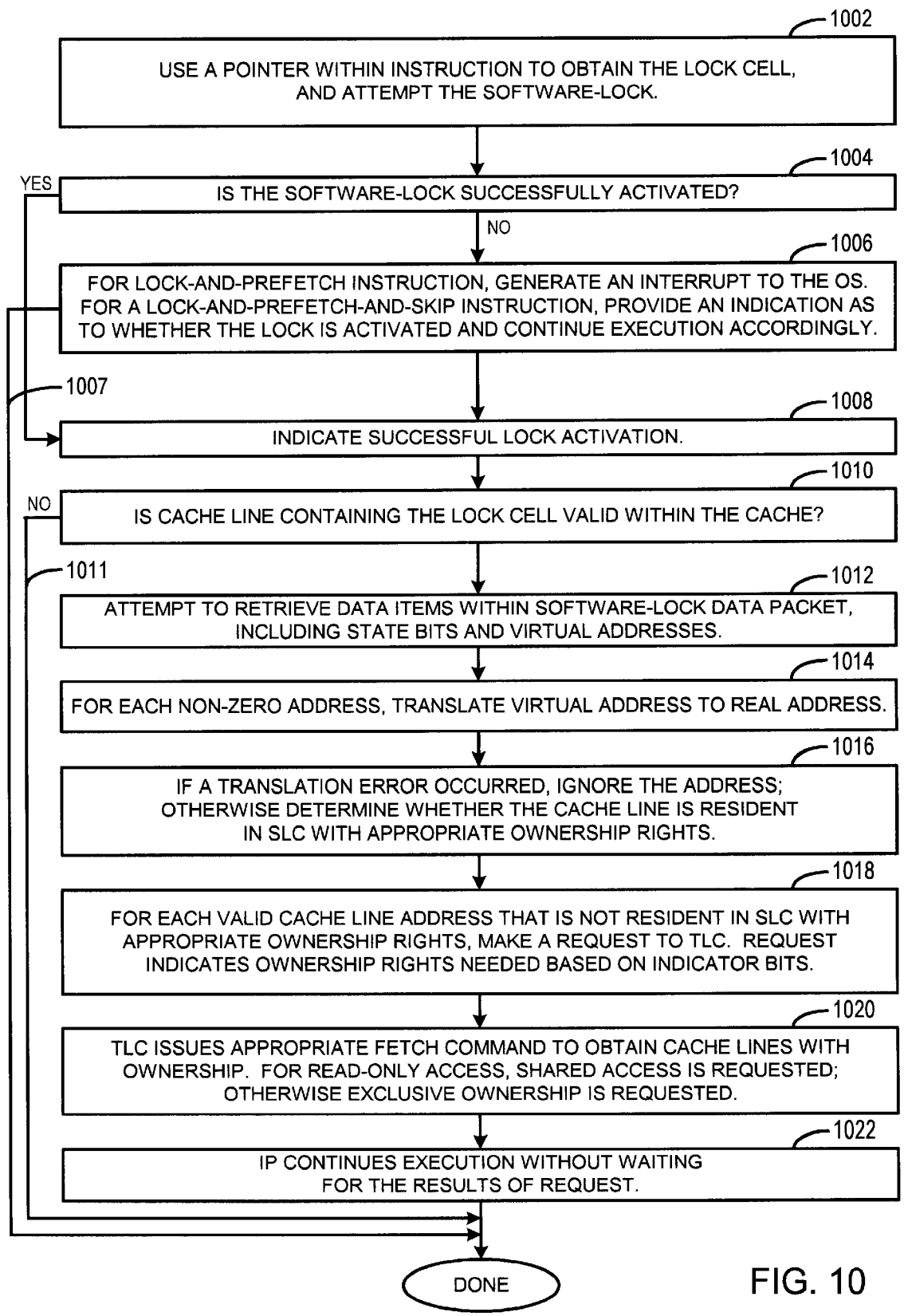
FIG. 10 is a flowchart illustrating a method for executing a Lock-and-Pre-Fetch-and-Skip and Lock-and-Pre-Fetch on a legacy lock cell.

FIG. 10 is a flowchart illustrating a method for executing a Lock-and-Pre-Fetch-and-Skip and Lock-and-Pre-Fetch on a legacy lock cell. This lock-type instruction, which in one embodiment may include the Lock-and-Pre-Fetch or the Lock-and-Pre-Fetch-and-Skip instruction, is executed by lock-and-prefetch circuit 352 of an IP. According to the current method, a pointer within the instruction is used to obtain the lock cell so that the software-lock may be attempted (1002). If the software-lock is successfully activated (1004), execution continues with step 1008.

If the software-lock activation attempt is unsuccessful, execution continues based on the type of instruction (1006). For a Lock-and-Pre-Fetch instruction, an interrupt is issued to the operating system to indicate the unsuccessful attempt. This may optionally cause a retry operation to occur later, depending on the operating system software implementation. For a Lock-and-Pre-Fetch-and-Skip, the instruction provides an indicator as to whether the software-lock was successfully activated. If so, the next instruction is skipped. Otherwise, the software-lock was previously activated by another thread such that the software-lock was not successfully activated. In this case, the next instruction is executed, and the thread determines whether to retry the operation or continue with other processing activities. After the unsuccessful attempt is handled in one of the foregoing ways, instruction execution is completed, as indicated by arrow 1007.

If the software-lock has been activated, successful software-lock activation is indicated (1008). Next, if the lock cell cache line is no longer valid in the cache (1010), instruction execution is exited as indicated by arrow 1011. Otherwise, instruction execution continues by attempting to retrieve various data items within data packet 400, including the state bits, and the virtual addresses (1012).

It may be noted that in the current method, a legacy lock cell is being used instead of a data packet 400 according to the current invention. Therefore, valid data items such as state bits and virtual addresses are not associated with the lock cell. Despite this fact, execution continues as if these items were present as follows. If a data item that is retrieved for use as a virtual address is set to zero, it may be ignored.

Otherwise, this data item is translated to generate a real address that can be used to retrieve a respective cache line (1014). If an error occurs during the process, the address is ignored. Otherwise a determination is made as to whether the real address is resident within the IP's SLC, and whether the appropriate access rights have been granted (1016).

If the falsely interpreted cache lines protected by the software-lock do not reside within the SLC, a request is made to the TLC to obtain the cache lines and the necessary access rights, as is determined by the falsely interpreted state bits (1018). If the TLC does not have a copy of the cache line with the desired access rights, the TLC issues a command to MSU 110 to return the cache lines and access rights (1020). If read/write access is requested, an exclusive copy is required. Otherwise, a shared copy is sufficient.

After the IP hardware makes the initial requests to the SLC for the cache lines, the IP may continue execution (1022). The IP is not required to wait for return of the requested cache lines.

Figure 11:
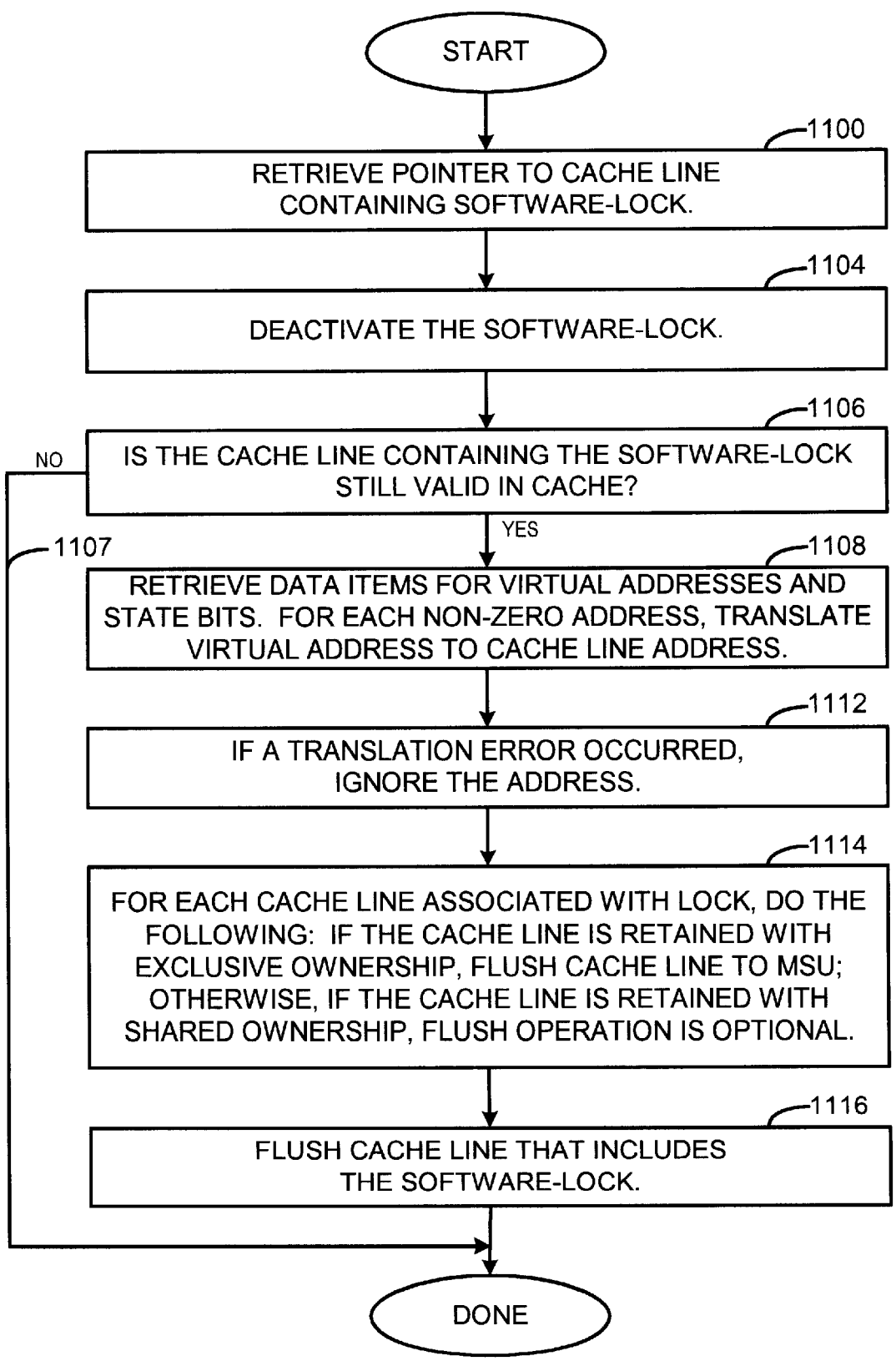
FIG. 11 is a flowchart illustrating a method of executing an Unlock-and-Flush instruction on a legacy lock cell.

FIG. 11 is a flowchart illustrating a method of executing an Unlock-and-Flush instruction on a legacy lock cell. As noted above, the Unlock-and-Flush instruction execution is supported by unlock-and-flush circuit 354. According to the method of FIG. 11, the pointer to the cache line containing the lock cell 400 is retrieved (1100). The lock indicator 424 is then cleared to deactivate the software-lock (1104). Next, if the lock cell cache line is no longer valid in the cache (1106), the instruction is exited (1107). If the lock cell cache line is in cache, the various data items falsely interpreted to be stored in the data packet cache line are obtained, including the state bits, and the virtual addresses. If a virtual address is set to zero, it may be ignored. Otherwise, the address is translated to generate a real address that can be used to flush a respective cache line (1108). If an address translation error occurs during this process, the associated cache line may be ignored (1112).

Next, execution flow continues in a manner that is determined by the type of ownership rights for that cache line as specified by W0, W1, and W2. For example, if the cache line is retained with exclusive ownership, a cache line flush is initiated to return the updated cache line and all ownership rights (1114). This can be accomplished, for example, by returning the cache line to the TLC, which, in turn, issues a Flush Block command to the MSU 110. Otherwise, if a cache line is retained with shared ownership, the flush operation is optional. The cache line that includes the lock cell is also flushed to the MSU to return both data and all ownership rights (1116). Because the cache line flush requests include addresses that were generated by misinterpreting data signals associated with the legacy lock cell, it is likely the addressed cache lines are not resident in the SLC. In such cases, the SLC will not generate the respective flush request.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following Claims and their equivalents.

What is claimed is:

1. A method for performing locks within a data processing system having a memory system coupled to multiple instruction processors (IPs), the method comprising:

a.) activating, on behalf of a requesting IP, a software-lock included within a lock cell stored within the memory system;

b.) retrieving at least one address protected by the software lock from the lock cell;

c.) issuing a request to copy data signals that are pointed to by the at least one address; and d.) allowing the IP to continue execution without waiting for data requested in step c).

2. The method of claim 1, wherein step a.) includes performing a lock-type instruction that is part of the hardware instruction set of the requesting IP.

3. The method of claim 2, wherein the lock-type instruction is selected from the group consisting of a Lock-and-Pre-Fetch-and-Skip instruction and a Lock-and-Pre-Fetch instruction.

4. The method of claim 1, wherein step a.) includes allowing software executed by the requesting IP to perform multiple attempts to activate the software-lock before the software-lock is activated successfully.

5. The method of claim 1, wherein steps b.) through d.) are repeated for multiple addresses associated with the software-lock.

6. The method of claim 5, wherein step b.) includes, for each of the at least one address protected by the software-lock:

obtaining a respectively associated indicator that indicates a type of access; and issuing a request that uses the indicated type of access to copy the data signals pointed to by the address.

7. The method of claim 1, wherein the memory system includes multiple cache lines, and wherein the at least one address is contained in a same cache line of the memory system as the software-lock.

8. The method of claim 6, wherein the memory system includes multiple cache lines, and each of the indicators is contained in the same cache line of the memory system as the software-lock.

9. The method of claim 8, wherein the type of access is selected from the group consisting of read-only and read/write access.

10. The method of claim 9, wherein the memory system includes a directory storage array for recording the type of access that are requested with the copied data signals.

11. The method of claim 8, wherein the software-lock is stored within a first cache line of the memory system, and wherein the data that is pointed to by the at least one address is stored in one or more cache lines of the memory system that are different from the first cache line.

12. The method of claim 9, wherein each of the IPs is coupled to a respective cache memory, and further including:

storing within the respective cache memory of the requesting IP the data signals that are pointed to by the at least one address; and executing one or more instructions that access the data signals stored within the respective cache memory.

13. The method of claim 12, and further including executing an Unlock-and-Flush instruction.

14. The method of claim 13, wherein executing the Unlock-and-Flush instruction includes deactivating, on behalf of the requesting IP, the software-lock.

15. The method of claim 14, wherein executing the Unlock-and-Flush instruction includes flushing the software-lock from the cache of the requesting IP to the main memory.

16. The method of claim 15, wherein the Unlock-and-Flush instruction is part of the instruction set of the requesting IP.

17. The method of claim 16, and including flushing to main memory predetermined ones of the copied data signals.

18. The method of claim 17, wherein the predetermined ones of the retrieved data-signals that were copied with read/write access are flushed to memory.

19. The method of claim 17, and including flushing to the main memory all of the copied data signals.

20. A method for performing locks within a data processing system having a memory system and multiple IPs coupled to the memory system, the method comprising:
   a.) executing, by one of the IPs, a lock-type instruction that is part of the hardware instruction set of the one of the IP;
   b.) under control of the one of the IPs during execution of the lock-type instruction, retrieving at least one address associated with the lock-type instruction;
   c.) issuing a request to retrieve a cache line that is pointed to by the at least one address; and
   d.) allowing the IP to continue execution without waiting for data requested in step c).

21. The method of claim 20, wherein step a.) includes executing the lock-type instruction to gain access to a software-lock stored within the memory system.

22. The method of claim 21, wherein step a.) further includes:
   determining that the software-lock is already activated by another IP; and
   taking predetermined action based on the unsuccessful activation attempt.

23. The method of claim 22, wherein the predetermined action includes retrying the activation attempt at a later time.

24. The method of claim 23, wherein the predetermined action includes generating an interrupt to an operating system executing on the one of the IPs.

25. The method of claim 22, wherein the software-lock is stored within a different cache line than the cache line addressed by the at least one address.

26. The method of claim 25, wherein step b.) further includes, for each of the at least one address:
   obtaining an indicator indicating access respectively associated with the at least one address; and wherein step c.) includes
   using the access to issue a request to the memory system for the cache line pointed to by the at least one address.

27. The method of claim 26, wherein the memory system includes a main memory having a directory array, and multiple cache memories coupled to the main memory, wherein ones of the cache memories are associated with ones of the IPs, and wherein step
   a.) includes storing, within a cache memory associated with the one of the IPs, the cache line containing the software-lock.

28. The method of claim 27, and further including:
   recording within the directory array the access used to issue the request; and
   providing to the cache memory associated with the one of the IPs a copy of each of the cache lines pointed to by the at least one address, wherein the copy is provided with the access used to make the request.

29. The method of claim 28, wherein the access are selected from the group consisting of read-only and read/write access.

30. The method of claim 29, and further including executing an Unlock-and-Flush instruction to deactivate the software-lock.

31. The method of claim 30, wherein executing the Unlock-and-Flush instruction includes flushing the cache line containing the software-lock back to the main memory.

32. The method of claim 31, wherein executing the Unlock-and-Flush instruction includes flushing the copy of the cache line pointed to by the at least one address back to the main memory.

33. The method of claim 32, wherein the Unlock-and-Flush instruction is part of the instruction set of the one of the IPs.

34. The method of claim 33, wherein the copy of the cache lines is flushed to main memory only if it was provided with a predetermined type of access.

35. The method of claim 34, wherein the predetermined type of access is read/write access.

36. The method of claim 21, and further including executing a legacy instruction to gain access to the software-lock stored within the memory system.

37. The method of claim 20, wherein the memory includes a legacy lock cell, and further including executing steps a.) through d.) to gain access to the legacy lock cell.

38. In a data processor having a memory coupled to multiple instruction processors (IPs), a system for managing protected data, comprising:
   storage locations within the memory to store a software-lock; and
   a lock circuit included within at least one of the IPs to execute a lock instruction to activate the software-lock, and to initiate a pre-fetch of the protected data from the memory while the IP continues instruction execution.

39. The system of claim 38, wherein the storage locations further store at least one address pointing to the protected data, and the lock circuit includes a circuit to retrieve the at least one address pointing to the protected data for use in initiating the pre-fetch of the protected data.

40. The system of claim 39, wherein the memory includes multiple cache lines, and wherein the software-lock and the at least one address pointing to the protected data are included in the same cache line.

41. The system of claim 40, wherein the protected data is included within one or more cache lines that are different from the cache line including the software-lock.

42. The system of claim 39, wherein the storage locations further store indicators, each indictor indicating a type of access to be associated with a respective one of the at least one address.

43. The system of claim 42, wherein the lock circuit includes a circuit to provide, for each of the at least one address, a request to the memory for the protected data pointed to by the at least one address, the request including a type of access indicated by the associated indicator.

44. The system of claim 43, wherein the memory includes a main memory and at least one cache memory coupled to the main memory, and wherein the main memory includes a circuit to receive the request, and to provide requested protected data and a type of access indicated by the request.

45. The system of claim 44, wherein the memory includes a directory array to store the type of access indicated by the request.

46. The system of claim 38, and further including an unlock circuit included within at least one of the IPs to execute a hardware unlock-and-flush instruction to unlock the software-lock.

47. The system of claim 46, wherein the unlock circuit includes a circuit to flush a predetermined portion of the protected data to the memory.

48. The system of claim 47, wherein the predetermined portion of the protected data was pre-fetched having predetermined access.

49. The system of claim 38, and further including a test-and-set circuit to execute a legacy test-and-set type instruction to activate the software-lock.

50. The system of claim 38, and further including a legacy unlock circuit to execute a legacy unlock instruction to deactivate the software-lock.

51. The system of claim 38, and further including a legacy lock cell contained within the memory, and wherein the lock circuit is capable of activating the legacy lock cell.

52. The system of claim 46, and further including a legacy lock cell contained within the memory, and wherein the unlock circuit includes a circuit to execute the hardware unlock instruction to deactivate the legacy lock cell.

53. In a data processor having a main memory coupled to multiple instruction processors (IPs), a system for managing protected data, comprising:
- one or more storage locations within the main memory to store a software-lock and the protected data;
- a cache memory coupled to the main memory to temporarily store the protected data after the software-lock has been locked; and
- an unlock circuit included within at least one of the IPs to execute a hardware unlock instruction to unlock the software-lock, and to flush the protected data from the cache memory back to the main memory.

* * * * *

UNITED STATES PATENT AND TRADEMARK OFFICE
CERTIFICATE OF CORRECTION

PATENT NO. : 6,816,952 B1
DATED : November 9, 2004
INVENTOR(S) : Kelvin S. Vartti et al.

It is certified that error appears in the above-identified patent and that said Letters Patent is hereby corrected as shown below:

Column 24,
Lines 1-2, the terms "protected by the software-lock" should be omitted.

Signed and Sealed this

Fourth Day of January, 2005

JON W. DUDAS
*Director of the United States Patent and Trademark Office*